(12) United States Patent
Larsen et al.

(10) Patent No.: US 6,741,348 B2
(45) Date of Patent: May 25, 2004

(54) ULTRASENSITIVE SPECTROPHOTOMETER

(75) Inventors: David W. Larsen, St. Charles, MO (US); Zhi Xu, St. Louis, MO (US); Wayne Garver, St. Louis, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 10/135,854

(22) Filed: Apr. 29, 2002

(65) Prior Publication Data

US 2003/0202179 A1 Oct. 30, 2003

(51) Int. Cl.[7] .......................... G01J 3/40; G01N 21/01
(52) U.S. Cl. ....................................... 356/319; 356/244
(58) Field of Search ................................. 356/319, 244

(56) References Cited

U.S. PATENT DOCUMENTS

| | | | |
|---|---|---|---|
| 3,877,817 A | * | 4/1975 | Ralston ..................... 356/409 |
| 4,059,405 A | | 11/1977 | Sodickson et al. |
| 4,070,111 A | * | 1/1978 | Harrick ..................... 356/308 |
| 4,213,703 A | | 7/1980 | Haunold et al. |
| 4,518,700 A | | 5/1985 | Stephens |
| 4,565,447 A | * | 1/1986 | Nelson ...................... 356/319 |
| 4,781,456 A | | 11/1988 | Nogami |
| 4,823,168 A | | 4/1989 | Kamahori et al. |
| 4,848,904 A | * | 7/1989 | Sapp et al. ................. 356/319 |
| 4,922,309 A | * | 5/1990 | Sekiwa et al. .............. 356/300 |
| 4,929,078 A | * | 5/1990 | Harmon ..................... 356/320 |
| 4,931,660 A | | 6/1990 | Mayer |
| 5,029,276 A | | 7/1991 | Buehler et al. |
| 5,134,276 A | | 7/1992 | Hobbs |
| 5,376,783 A | | 12/1994 | Vecht et al. |
| 5,434,412 A | * | 7/1995 | Sodickson et al. ......... 356/405 |
| 5,540,825 A | | 7/1996 | Yeung et al. |
| 5,628,891 A | | 5/1997 | Lee |
| 5,680,209 A | | 10/1997 | Machler |

(List continued on next page.)

FOREIGN PATENT DOCUMENTS

JP 06053919 A * 2/1994 ............. H04J/3/00

OTHER PUBLICATIONS

Product Catalog 2003, Ocean Optics, Inc.
"Double beam laser absorption spectroscopy: short noise–limited performance at baseband with a novel electronic noise canceller", Kurt L. Haller, and Philip C.D. Hobbs, SPIE vol. 1435, Optical Methods for Ultrasensitive Detection and Analysis: Techniques and Applications (1991) pp. 298–309.

*Primary Examiner*—F. L. Evans
*Assistant Examiner*—Kara Geisel
(74) *Attorney, Agent, or Firm*—Greer, Burns & Crain, Ltd.

(57) ABSTRACT

The invention concerns improvements in spectrophotometry. Aspects of the invention may be used independently or together to increase the sensitivity of spectrophotometry. One aspect of the invention is a spectrophotometer detection circuit. In this aspect of the invention, currents attributable to reference and sample beams are cancelled in the current mode. The detection circuit produces a first voltage proportional to the difference in currents and a second voltage proportional to one of the reference or sample beams. Both voltages are available to allow simultaneous measurement and analysis. Another aspect of the invention concerns thermal stability. According to the invention, thermal conductivity is established among the housing and optical system components to promote equilibrium. Another preferred embodiment has a unitary solid metal housing with a hollowed portion defined to mount and place optical system components. Recognition and identification of important noise sources in spectrophotometers forms an aspect of the invention contributing to the features and combinations of features in preferred embodiments. Many noise sources would not normally be considered in conventional spectrophotometry because the magnitude of particular noise sources dominates device performance.

38 Claims, 10 Drawing Sheets

U.S. PATENT DOCUMENTS

| | | |
|---|---|---|
| 5,742,200 A | 4/1998 | He |
| 5,745,243 A | 4/1998 | Wilcox et al. |
| 5,983,709 A * | 11/1999 | O'Keeffe .................... 356/436 |
| 6,002,477 A * | 12/1999 | Hammer .................... 356/307 |
| 6,040,914 A | 3/2000 | Bortz et al. |
| 6,097,034 A | 8/2000 | Weckstrom et al. |
| 6,108,083 A | 8/2000 | Machler |
| 6,207,369 B1 | 3/2001 | Wohlstadter et al. |
| 6,243,170 B1 | 6/2001 | Ershov |
| 6,249,348 B1 | 6/2001 | Jung et al. |
| 6,297,505 B1 * | 10/2001 | Frandsen et al. ........... 250/436 |
| 6,449,040 B1 * | 9/2002 | Fujita ........................ 356/319 |

* cited by examiner

ULTRASENSITIVE SPECTROPHOTOMETER

FIELD OF THE INVENTION

The field of the invention is spectrophotometry. Devices and methods of the invention are applicable to all uses of spectrophotometry, i.e., the measurement of light absorption or scattering in liquids, gases and solids, in addition to absorption, reflection, and scattering of light at interfaces. A wide range of spectroscopic and analytical instruments and devices may benefit from the invention. Exemplary applications of the invention include Ultra Violet-Visible (UV-Vis), Infrared (IR), Atomic Absorption (AA), circular dichroism (CD) spectrophotometers, and High Performance Liquid Chromatography (HPLC).

BACKGROUND OF THE INVENTION

A fundamental property of a sample, be it gas, liquid or solid, is its tendency or lack of tendency to absorb or scatter light at certain wavelengths. Characterization of the tendency of a sample to absorb, scatter or transmit is the basis for spectrophotometry. Example applications include chemical and biological sample analysis. Other example applications include manufactured product testing and the testing of air or water quality.

The point of any application of quantitative spectrophotometry is the ability to numerically characterize a sample in order to discover sample properties or to differentiate it from another sample. Irrespective of the application, the critical aspects of quantitative spectrophotometry are sensitivity, precision, and accuracy. The sensitivity of a spectrophotometric measurement directly relates to the ability to detect small differences between samples having similar absorption properties. The greater the sensitivity, the smaller the difference that can be detected. The precision of a spectrophotometric measurement may be considered as a function of the ability to repeat the same measurement for an identical sample at different times. The accuracy of a spectrophotometric measurement may be considered as a function of the ability to correctly determine the numerical measure of the sample composition. The latter is critical, for example, when attempting to quantify an unknown element in a sample. Over a given range of concentration, the quantification is characterized by certain levels of precision and accuracy. However, below the lower limit of the concentration range, both precision and accuracy are adversely affected. This lower limit is the detection limit of the particular spectrophotometric instrument. As sensitivity increases, the detection limit decreases. Improvements in sensitivity, while retaining high levels of precision and accuracy are desirable.

One known application of spectrophotometry is spectrophotometric chemical analysis. Consideration of this technology is useful to illustrate the problems encountered when practical devices are used to measure light absorption. Spectrophotometric chemical analysis is a standard method for the determination of concentrations of light absorbing substances in liquids and gases. If solutions are studied, the substances are referred to as solutes. In practice, the quantity measured is the Absorbance (A), which is defined by the Beer-Lambert law as $A=-\log T$, where T is the Transmittance. The Absorbance, which is given in Absorbance Units (AU), is proportional to C, the concentration of the absorbing substance by the relationship $A=\epsilon LC$, where L is the length of the light path through the sample and $\epsilon$ is a proportionality constant called the Absorptivity, which is specific to the absorbing substance. In order for the equations to be valid, terms A and T must relate only to absorption of light by the solute. Correction must be made for any interference, i.e., absorption other than that attributable to the solute. In practical devices, that type of interference can arise from various sources such as absorption/scattering attributable to the solvent or light reflected by portions of the device being used to measure absorption.

Spectrophotometers generally include a controlled optical system, a sample, detection system, and means for data analysis. The optical system produces a controlled beam or beams to pass through the sample or samples and then be collected by detectors. Detector outputs, which are proportional to the light powers, are then used for data analysis. A typical spectrophotometer has a dual beam optical system and is equipped with two cells, designated Sample and Reference. The power of light emerging from the cells results in detector currents, $i_S$ and $i_R$, which are converted to voltages, $V_S$ and $V_R$, respectively. For the precise measurement of A, interference corrections are performed by making two separate determinations. First, the ratio $Q_0=V_{S0}/V_{R0}$ is determined with pure solvent in both S and R cells. Second, the ratio $Q=V_S/V_R$ is determined with solution in the S cell and pure solvent in the R cell. Thus, one calculates $T=Q/Q_0$ and $A=-\log T$. Care must be taken when discussing the Absorbance because some systems give a response that is not identical to A as defined herein. Such a response may be useful as a qualitative indicator for monitoring purposes and it is often referred to as an "Absorbance". Absorbance values referred to in this application concern the absorbance values as defined by the Beer-Lambert Law, a quantitative measurement.

Others have recognized some sensitivity limits in spectrophotometry and some attempts have been made to reduce noise. Different spectrophotometric devices will have different limits. The sensitivity limits vary depending on the spectral region in question. Consider a UV-visible scanning instrument, of the type that is widely used for chemical analyses. This instrument uses a Tungsten lamp source to cover the visible range. The detectors are either photodiodes or photomultipliers. The generally accepted standard noise specification (Absorbance standard deviation) for high quality commercial units is $\sigma_A=5\times10^{-5}$ AU (at 500 nm wavelength, 1 sec time constant). There is some misconception that this noise originates in the detectors as shot noise. However, with the use of a light meter equipped with a Silicon photodiode detector, it is easy to monitor the power output of a Tungsten lamp with a regulated power supply in a laboratory setting. Analysis of such results obtained by us shows that the Relative Noise Standard Deviation, $\sigma_V/V$, is about $5\times10^{-5}$, which (from the Beer Lambert Law) equals a noise level Standard Deviation of about $2\times10^{-5}$ AU, similar to the commercial noise level specification. Also, this noise is independent of the light power received by the detector in contrast to the basic characteristics of shot noise. Of course, other light source types will have different noise characteristics.

Furthermore, this noise level is about 100-fold greater than the calculated shot noise with detector current of 1–2 $\mu A$, as in the present embodiments. Thus, source noise is a more important factor than detector shot noise in determining spectrophotometer sensitivity. That source noise limits performance was recognized by Haller and Hobbs. See, K. L. Haller and C. D. Hobbs, SPIE Vol. 1435, pp. 298–309 (1991).

Where source noise is determined to be dominant, steps can be taken to reduce the noise. Use is made of the fact that source noise is coherent in the two beams of a dual beam spectrophotometer, in which case, it is known that at least some of the noise can be canceled. Various noise cancellation circuits have been proposed. The detector circuit of Hobbs (U.S. Pat. No. 5,134,276) has been cited in the patent literature and elsewhere. Noise cancellation occurs because the source and reference currents are balanced at a node in the circuit. To accomplish this, the reference current is divided by use of a differential transistor pair that acts as a current splitter. The differential voltage controls fractions of current through the two legs of the current splitter across the transistor bases. Current balance can be achieved manually by applying an external differential voltage or it can be achieved automatically by use of a feedback loop to supply the differential voltage. The circuit has been used as a means to cancel laser noise both in communications and spectrophotometric applications.

The Hobbs circuit is also used for noise suppression in a capillary separation system, see Yeung et al., U.S. Pat. No. 5,540,825. A laser is used to monitor liquid flowing through a capillary, so that when a light absorbing substance enters the region of the capillary being monitored, it can be detected. A commercial detection system was replaced with the circuit of Hobbs, and noise reduction was obtained. A commercialized version of the Hobbs circuit is sold under the Trade Name "Nirvana."

To use the circuit of Hobbs, one measures the voltage output, LOGO=$K \ln(i_R/i_S-1)$, where K is a proportionality constant. Thus knowing K, one can calculate Q=$i_S/i_R$ from LOGO. K may be readily adjusted since it is determined by resistors in a voltage divider network. The automatic balance feature of the circuit makes it very convenient to use. However, there is one disadvantage that may not be immediately obvious, which has to do with the properties of the term $\ln(i_R/i_S-1)$. This function becomes infinite as $i_R \to i_S$, so that a sufficient imbalance in detector currents is necessary for proper operation. Depending upon the size of the imbalance, it may be necessary to measure small changes superimposed on relatively large voltages. For example, with electronic components values as given by Hobbs, and with a Tungsten source, and Silicon photodiode detectors, typical values for Reference and Sample detector currents are 2.5 $\mu$A and 2 $\mu$A, respectively, and LOGO is 1.470089 V. If the Sample current is reduced by 1 ppm (1 part in $10^6$), LOGO is 1.470077 V. In this example, the numbers show LOGO must be determined to 7 significant figures (accuracy of a few parts in $10^7$) in order to measure an Absorbance of $10^{-6}$. This is a potentially significant disadvantage because of potential tracking errors and digitization requirements.

The term $\ln(i_R/i_S-1)$ becomes zero as $i_R \to 2 i_S$, so that it is possible to make LOGO small by adjusting the beam intensities to a ratio of 2:1. This is readily accomplished when measurements are made at a single wavelength or over a very small wavelength range, as with laser studies of Haller & Hobbs. However, for general purpose spectrophotometry, measurements are made over a large range of wavelengths, as with a scanning instrument or multiple filter unit. In this case, the varying splitting ratio of the beam splitter, which is strongly wavelength dependent, will ensure that LOGO will be large over some portion of the wavelength range, which can give rise to the measurement limitations relating to tracking errors and digitization requirements discussed above. Haller and Hobbs also recognized that the experimental apparatus required to perform high sensitivity spectrophotometry is subject to serious noise and drift problems.

Another noise canceling circuit is described by He in U.S. Pat. No. 5,742,200. This circuit functions with feedback similar to the Hobbs circuit, but it can also provide bias so that the background output can be adjusted to zero voltage. However, the bias voltage would have to be continuously adjusted to maintain balance over a broad wavelength range.

Such noise cancellation techniques will have applicability in special applications to cancel coherent noise. While it is possible to use either of the circuits described above (or others) to cancel coherent source noise in special circumstances, general spectrophotometry as used for routine chemical analysis and similar applications presents additional problems. Generally, the wavelength of the source must be variable, so that a laser cannot be used in general. Also, once the source noise is cancelled, thermal noise/drift becomes dominant, as will be described in detail below. Thus, there remains a need in the art. The present invention seeks to improve upon the state of the art of spectrophotometry.

SUMMARY OF THE INVENTION

The invention concerns improvements in spectrophotometry. Aspects of the invention may be used independently or together to increase the sensitivity of spectrophotometry. Exemplary preferred aspects and embodiments of the invention will be briefly summarized now.

One aspect of the invention is a spectrophotometer detection circuit. In this aspect of the invention, currents attributable to reference and sample beams are cancelled in the current mode. The detection circuit produces a first voltage proportional to the difference in currents and a second voltage proportional to one of the reference or sample beams. Both voltages are available to allow simultaneous measurement and analysis. Another aspect of the invention is a unique beam splitter configuration, which uses three beam splitters to ensure that the relative powers, phases, and polarizations of two beams derived from a single light source remains constant over a range of wavelengths. Another aspect of the invention concerns thermal stability. According to the invention, thermal conductivity is established among the housing and optical system components to promote equilibrium. One preferred embodiment has a unitary solid metal housing with a hollowed portion defined to mount and place optical system components. An additional aspect of the invention concerns optical filtering of the spectrophotometer source beam. In a preferred embodiment spectrophotometer, the optical source is isolated by making it external to other device components, and feeding the beam in through an optical fiber. Partially polarized light emerges from the optical fiber. The inventors have recognized dependence of the polarization effect upon ambient temperature, and the resultant potential differential drift in the optical system. A preferred embodiment spectrophotometer uses a holographic diffuser to reduce dependence of the beam splitting ratio upon varying polarization.

Recognition and identification of important noise sources in spectrophotometers forms an aspect of the invention contributing to the features and combinations of features in preferred embodiments. Many noise sources would not normally be considered in conventional spectrophotometry because the magnitude of particular noise sources dominates device performance. Thus, another aspect of the invention addresses the potential interferences caused by airborne particulates in the beam paths, bubbles and suspended particulates in liquids under study, and changing temperature at the glass/liquid interfaces in liquid cells. Another aspect of the invention addresses the potential interference caused by light reflected from the surfaces of the detectors.

BRIEF DESCRIPTION OF THE DRAWINGS

Other features, objects, and advantages of the invention will be apparent to those skilled in the art by reading of the detailed description in view of the drawings, of which.

DETAILED DESCRIPTION OF THE PREFERRED EMBODIMENTS

Figure 1:
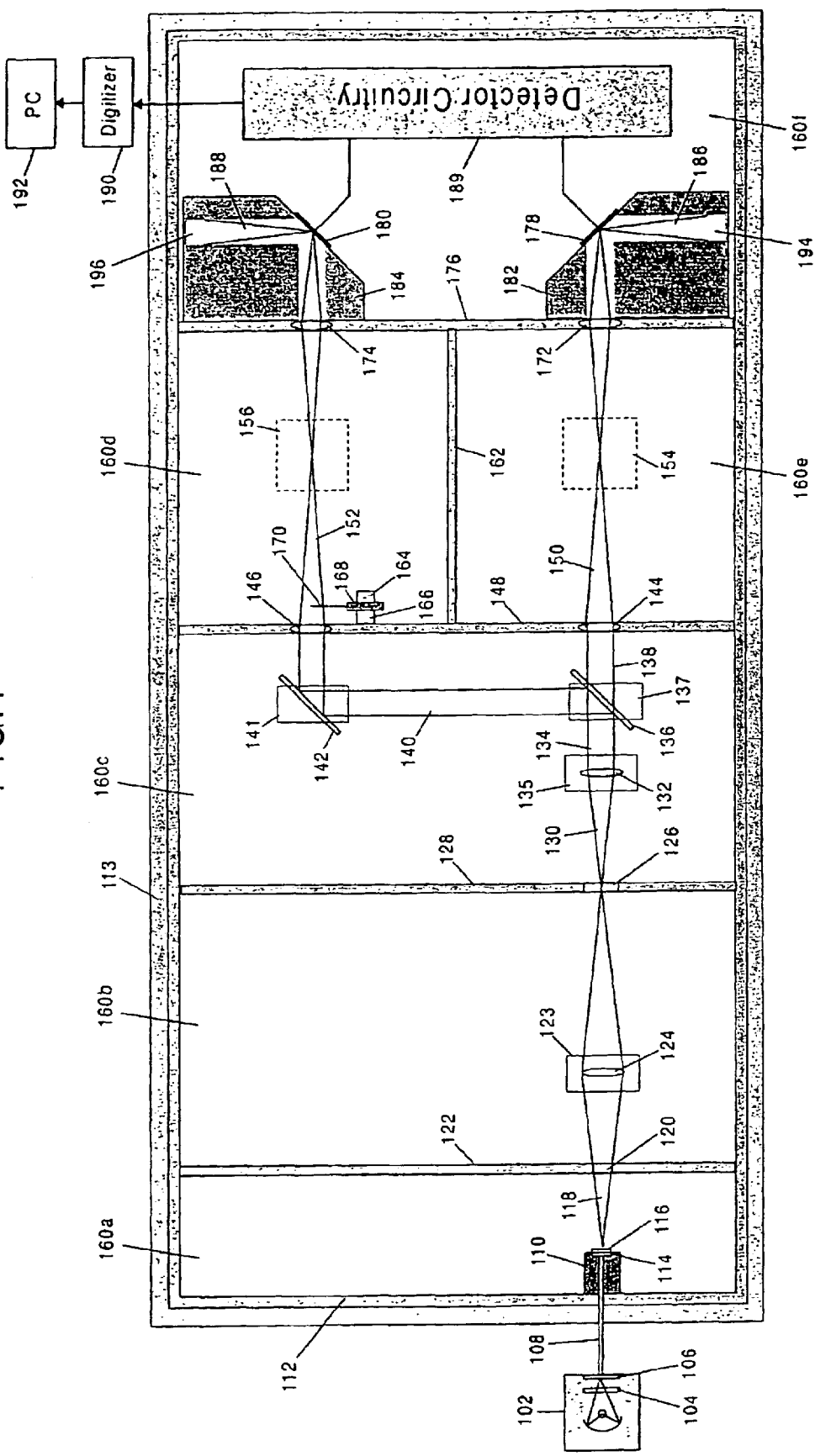
FIG. 1 is a top schematic view of a preferred embodiment spectrophotometer with its cover removed.

The invention is broadly directed to increased sensitivity in spectrophotometry. In illustrating principles of the invention, part of the discussion will include reference to an experimental prototype device. Artisans will appreciate that the invention is not limited thereto, however. Broader aspects of the invention include identification of noise-contributing components in spectrophotometry and the select set of preferred features in a given embodiment.

I. Sensitivity in Spectrophotometry

A. Detection and Evaluation

A method to increase the sensitivity of spectrophotometry begins with the identification of the noise contributing components. Source noise has been identified in the prior art, as mentioned above. Another factor limiting the sensitivity of conventional spectrophotometers results from the conventional method used to evaluate Q and $Q_0$. In typical units, reference and sample voltages are measured independently, and experimental errors propagate such that the standard deviation in T is given by:

$$\sigma_T = T[(\sigma V_S/V_S)^2 + (\sigma V_R/V_R)^2 + (\sigma V_{S0}/V_{S0})^2 + (\sigma V_{R0}/V_{R0})^2]^{1/2}$$

Since the voltage outputs are of similar size ($V_R \approx V_S \approx V_{R0} \approx V_{S0}$), the standard deviations are also of similar size ($\sigma V_R \approx \sigma V_S \approx \sigma V_{R0} \approx \sigma V_{S0}$). In addition, if we are measuring small Absorbances, T≈1, and we conclude: $\sigma_T \approx 2 (\sigma V_R/V_R) \approx 4 \times 10^{-5}$ AU, which is very close to the commercial specification, $5 \times 10^{-5}$ AU, as stated above.

B. Transmittance Measurement with Cancellation of Coherent Noise and Shot Noise Limit Embodiments.

Noise cancellation requires that a specific formalism be given for implementing the cancellation in such a way that the Absorbance can be determined. For our invention, we introduce a new variable $V_D \equiv V_S - V_R$. Thus, the term to be measured, $Q = V_S/V_R$, is expressed as $Q = V_D/V_R + 1$ and the coherent noise cancels in the measurement of $V_D$. Since the relative noise levels are identical in the two beams, the cancellation becomes exact as $V_S \rightarrow V_R$. The relative noise in the measured value of $V_R$ is unchanged, and the measurement errors propagate to give a standard deviation: $\sigma_Q = [V_D/V_R][(\sigma V_D/V_D)^2 + (\sigma V_R/V_R)^2]^{1/2}$. In practice $\sigma V_D/V_D \approx 10^{-2}$ because although the source noise contribution to $V_D$ can be made small, $\sigma V_D$ itself can only approach a limit dictated by other sources of noise, such as shot noise, and since $\sigma V_R/V_R \approx 10^{-5}$, $(\sigma V_D/V_D) >> (\sigma V_R/V_R)$. Thus: $\sigma_Q \approx (\sigma V_D/V_R)$. In principle, all sources of noise can be minimized down to the fundamental level of the incoherent shot noise of the detectors, in which case $\sigma V_D \approx [2]^{1/2} \sigma_{SHOT}$, and $\sigma_Q \approx [2]^{1/2} (\sigma_{SHOT}/V_R)$. $\sigma_{SHOT}$ is the noise produced by a single detector, so the factor $[2]^{1/2}$ appears because there are two detectors. The Standard Deviation in Transmittance is given by $\sigma_T = 2 T \sigma_{SHOT}/V_R$.

Some principles of the invention have been demonstrated in experimental prototype devices. These experimental devices and measurements will be discussed to help illustrate the invention, while the invention is not limited thereto. Performance increases beyond the prototype performance are also to be expected because, in a given application of the invention, specially manufactured components may increase, for example, fit and tolerances compared to the one-time built exemplary prototypes.

Under our experimental conditions, $\sigma_{SHOT} \approx 1.7 \times 10^{-7} - 2.0 \times 10^{-7}$ AU. Thus the potential reduction of noise when a Tungsten light source is used is of order: $\sigma V_R/\sigma_{SHOT} \approx 10^2$. Some embodiments of the invention seek to realize this type of reduction by applying a combination of the aspects of the invention, i.e., individual solutions to all identified sources of noise. In these preferred embodiments, such a reduction will only be realized after all important sources of noise are identified and minimized. Preferred embodiments of the invention have exhibited noise levels very near the shot noise limit.

II. A First Preferred Embodiment Spectrophotometer Including a Preferred Combination of Features for Noise Reduction/Increased Sensitivity.

A first preferred embodiment spectrophotometer is illustrated in FIG. 1. The spectrophotometer of FIG. 1 embodies multiple inventive aspects, including an identification of noise sources and methods for addressing noise sources. The overall embodiment provides a useful framework to illustrate aspects of the present invention, which artisans will understand are broader than and applicable outside of the FIG. 1 preferred embodiment. The FIG. 1 preferred embodiment device, for simplicity of illustration, is a single wavelength, filter unit that operates in the visible range with an Incandescent source (Tungsten lamp).

The general beam path in the FIG. 1 preferred embodiment is the typical dual beam configuration used for spectrophotometry. Light from a source 102, e.g. a Tungsten lamp, passes through two broad band optical filters 104, 106 and is carried by a light guide 108, preferably a fiber optic cable to the instrument. The light guide 108 has a low thermal conductivity, to avoid heat transfer from the light source into the device and is attached via a sealed mount 110. The mount 110 is sealed to prevent dust and stray light from entering the housing. The mount 110 is directly attached to an interior surface of housing wall 112.

This serves to isolate the light source 102. The particular choice for the type of light source will depend upon the specific application. The invention can be implemented over the entire spectral range from the UV to the Far IR, and the light source may be chosen as appropriate. Additional exemplary suitable light sources include the following: argon lamp, xenon lamp, hydrogen lamp, deuterium lamp, tungsten lamp, arc lamp, hollow cathode lamp, Nernst glower, nichrome wire, globar, lasers. The light source 102 is made external as a means of thermal isolation from other components of the preferred spectrophotometer.

The light source is usually capable of creating significant heat that can be transferred into the optical and detector portions of the spectrophotometer. The hot light source 102 is external to minimize conductive heat transfer to the instrument, allowing convective heat transfer into the surrounding environment instead. In addition, a thermal insulation layer 113 minimizes heat transfer from the surrounding environment to the preferred spectrophotometer. The filters 104 and 106 preferably include both ultraviolet and infrared cutoff filters to narrow the energy range of transmitted light so that "cold" light is produced and heat transfer by radiation is limited.

The preferred fiber optic light guide 108 has a polarization ratio that is sensitive to position and curvature of the fiber core. The guide fiber optic cable 108 is attached to mount 110, which contains a holographic diffuser 114 to reduce polarization, and aperture 116 to reduce the actual source diameter to a size, e.g., ⅛" for better collimation and focusing.

An emergent beam 118 passes through a second aperture 120 in a wall 122 and is collected and refocused by a double convex lens 124 configured with a 1:1 conjugation ratio. After passing through an interference filter 126 in a wall 128, a narrow band emergent beam 130 passes through a plano-convex collimation lens 132, which produces a collimated beam 134. The diameter of the collimated beam 134 is designed to be smaller than the open optical aperture of lenses 144 and 146. The lenses 124 and 132 are held in commercial optical holders mounted on thermally conductive mounts 123 and 135, respectively. The mounts have a large thermal capacity. A solid metal block is preferred for these mounts.

A dielectric beam splitter 136 produces, along separate paths, a transmitted (Sample) beam 138 and a reflected (Reference) beam 140, which is further reflected by a mirror 142. Beam splitter 136 is held in a brass holder fabricated by us and mirror 142 is held by a commercial adjustable holder, supported by optical mounts 137 and 141, respectively. These mounts have similar structure to mounts 123 and 135, with large heat capacity. The dielectric beam splitter 136 has a beam splitting ratio that is sensitive to the polarization of the incident beam 134. For example, for a dielectric beam splitter with average 60% transmission and 40% reflection, the transmission is only 42% for s-polarized light but is 76% for p-polarized light. Light emerging from a monochrometer or optical fiber is partially polarized and the polarization ratio is subject to thermal and mechanic drift. In an exemplary experimental prototype of the invention, the optical fiber 108 had ⅜" core diameter. The polarization ratio is very sensitive to the position and curvature of the fiber core. Changes in the room temperature can easily cause changes in the relative differential voltage ratio $V_D/V_R$, which is a measure of the imbalance between the two beams, of order $10^{-5}$ or larger. Passing the light emerging from the fiber optic through the holographic diffuser 114 reduces the polarization ratio by a factor of 100. Thus, the polarization is essentially completely scrambled and the beam splitting ratio is much less susceptible to thermal drift so that differential stability is increased. The inventors also found that a traditional glass diffuser with roughened surface is not effective because it does not provide sufficient polarization scrambling.

The sample 138 and reference 140 beams pass through focusing lenses 144 and 146 in a wall 148, and focused beams 150 and 152 enter a sample cell holder 154 and a reference cell holder 156, respectively. The sample holder 154 is in a compartment 160e and the reference holder in a compartment 160d. The two chambers are separated by a wall 162. The balance of the beams is facilitated by the overall thermal stability features of the preferred embodiment, and the optical system in general, including the dielectric beam splitter 136. To help balance the two beams, the power of the reference beam 152 can also preferably be attenuated by adjusting a high precision optical attenuater 164. The attenuator includes a mount 166, a precision micrometer-type screw 168 and a thin rod 170. The beams continue through focusing lenses 172 and 174 mounted in a wall 176 and are collected by detectors 178 and 180, which are mounted in thermally conductive housings 182 and 184, respectively. The detectors are preferably mounted at 45° angles to the incident light directions within housings 182 and 184. Thus, light beams 186 and 188 reflected by the detector surfaces remain trapped inside the housings in light traps 194 and 196, respectively. The photodiode detectors produce photocurrents, which are fed to a detector circuit 189. An appropriate detector will produce a current that varies in precise proportion to the power of an impingent (sample or reference) beam. Alternative potential detectors include, for example: photomultipliers, phototubes, photocells, charge transfer conductor, thermocouples, bolometers, pyroelectric cells, and infrared detectors. The circuitry produces output voltages, which are fed through the housing 112 to a digitizer 190 and analysis circuit 192, realizable, for example, with a computer.

A thermally conductive circuit is established among internal components through a base (not shown) having a large thermal capacity. In an experimental prototype, the base was ¾ inch solid steel and mounts 123, 135, 137, 141, 154, and 156, and the various walls and outer housing were attached directly thereto. The base and an unshown top cover and the housing outer wall 112 form a conductive heat transfer circuit with internal components. The cover, base and wall 112 are insulated from the environment, for example, with ½ inch commercial installation 113. This slows the response of internal temperature to a change in the outside environment. The internal thermal conductivity promotes equilibrium among internal components.

Figure 2A:
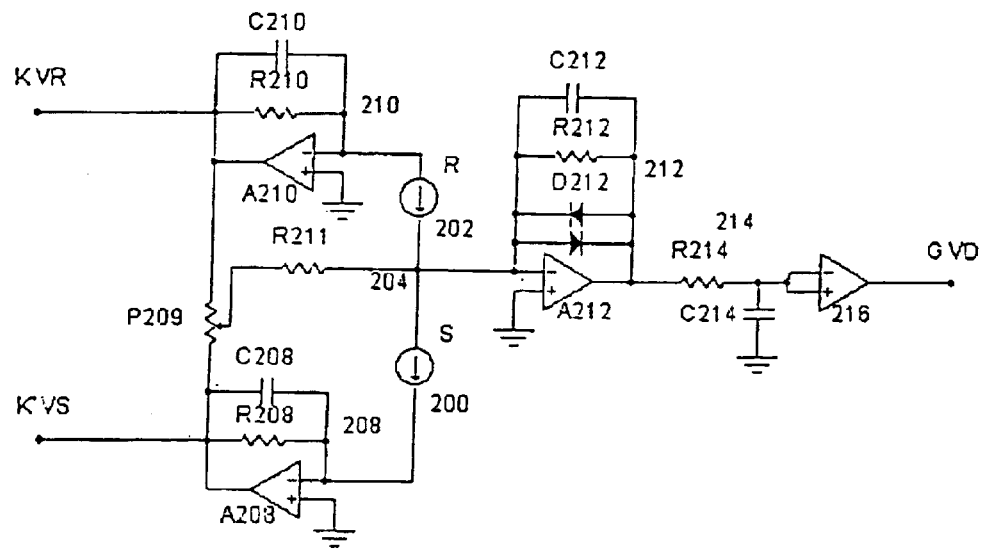
FIGS. 2A and 2B illustrate preferred embodiment detector circuits.

A preferred embodiment detector circuit is shown in FIG. 2A. An exemplary experimental prototype circuit according to the preferred FIG. 2A (top) embodiment was made with inexpensive, commercially available components.

In FIG. 2A, currents from the Sample (S) and Reference (R) photodiodes 178 and 180 (FIG. 1) are represented as constant current sources 200 and 202, respectively. The photodiodes are configured so that the difference in their photocurrents appears at a node 204. A converter 208 (including A208, R208, and C208) converts the S photocurrent 200 to a voltage, which is fed to one end of a potentiometer P209. A converter 210 (including A210, R210, and C210) converts the R photocurrent 202 to a voltage, which is fed to the other end of the potentiometer P209. The output voltage from converter 208 is negative, while that from converter 210 is positive, so the full voltage difference is dropped across P209. This voltage will follow the DC power of the light source, and it will also contain noise and drift components of the light source. The polarity and magnitude of the output voltage from P209 varies with the position of the potentiometer. For example, voltage can be varied continuously from K $V_R$ (which is positive) through zero to K' $V_S$ (which is negative). The constants are K=R212/R210, and K'=R212/R208. This voltage from P209 is fed back as a current through a feedback resistor R211 to the node 204. The feedback current precisely tracks the light source power, and its magnitude and polarity is determined by the values of several components (R208, R210, P209 and R211). Thus, addition of this feedback current to node 204 has the effect of increasing the magnitude of either the S photocurrent or the R photocurrent, depending upon the setting of P209. With this provision, careful adjustment of the feedback current by use of potentiometer P204 allows the S and R photocurrents to be balanced so that the source noise can be cancelled to a high degree. If the S photocurrent is greater than the R photocurrent, P209 is adjusted to give the required positive voltage output, and vice versa. Component values are chosen to make the feedback current of suitable size to allow the S and R photocurrents to be balanced. In our prototype embodiment, after coarse photocurrent balance by means of optical attenuator 164 (FIG. 1), the required feedback current was less than 1% of the S photocurrent, and a very small degree of photocurrent imbalance (e.g., $10^{-5}$) was easily attained. Because the degree of source noise cancellation equals the degree of photocurrent imbalance in the circuit, $10^{-5}$ imbalance is more than sufficient to allow detector shot noise performance to be attained. In our exemplary prototype embodiment, $10^{-3}$ photocurrent imbalance is sufficient to ensure shot noise limited performance.

For Absorbance measurements at a single wavelength, the detector currents must be first balanced with solvent in both Sample and Reference cells. Following this, a measurement is made with analytical sample in the Sample cell. Since the balancing need be done only once, P209 can be a simple potentiometer as shown in both FIGS. 2A. and 2B. However, for Absorbance measurements made over a range of wavelengths, as with a scanning unit, the detector currents must be balanced at multiple wavelengths, with solvent in both Sample and Reference cells. This will in general require a different setting of P209 at each wavelength, so that when the spectrum is scanned with the analytical sample in the Sample cell, the setting of P209 will have to be changed prior to measuring each data point in the scan. Each P209 setting will correspond to the value that ensures balance at that particular wavelength. To accomplish this, P209 can be replaced with a computer controlled digital potentiometer, with the settings for every wavelength stored in memory.

In the balance condition, the total current at the input of a difference amplifier 212 approaches zero and source noise cancellation is achieved. The source noise cancellation is done in the current mode at node 204 so that S and R photocurrents are directly subtracted. The difference is then converted to an output voltage at the difference amplifier 212 (including A212, R212, C212, and D212). This is the simplest and most accurate method. The output of the difference amplifier 212 is fed through a low-pass filter 214 (including R 214 and C214) to an additional voltage amplifier 216 with gain G to produce and output difference voltage G $V_D$. The standard deviation of output G $V_D$ is determined by the shot noise of the detectors, not by the source noise as described above.

For measurement of large Absorbance values, noise cancellation is not required and the Transmittance can be obtained from the outputs of the 208 and 210 directly. For large Absorbances, diodes D212 limit the voltage output for difference amplifier 212. This controls interference relating to drift in the output of the difference amplifier 212. In experimental prototype devices, we have observed that, for a period of time after the difference amplifier produces an output of the order of volts, it is subject to drift, and this interferes with the accurate measurement of small $V_D$ values at output 216.

For $|V_R|>|V_S|$, Absorbance determination requires measurement of Q=$V_D/V_R$+1 and for $|V_R|<|V_S|$, Absorbance determination requires measurement of Q=$[1-V_D/V_S]^{-1}$. $V_D$ is available as the output voltage of 216 divided by G, the gain of the amplifier 216, $V_R$ is the output of 210 divided by the factor K, and $V_S$ is the output of 208 divided by the factor K'. $V_D$, $V_S$ and $V_R$ are available as separate output voltages so that $V_D$ and either $V_R$ or $V_S$ can be measured simultaneously, which is necessary to avoid error attributable to source drift. Source power drift must be considered because both $V_D$ and $V_R$ (or $V_S$) are directly proportional to source power. If $V_D$ and $V_R$ (or $V_S$) are not measured simultaneously, their ratio will vary as the source power changes between the times of measurement of the two voltages. However, with simultaneous measurement, the source power dependence cancels.

The correction performed in the detector circuit is aided by an optical balance, which can be positioned in either the Reference or Sample beam, or in both beams. The overall design of the optics should assure a near balance in the beams. A preferred feature also introduces a balance adjustment to fine tune the beam balance. If the beams are near balance in the overall design of the unit, there are two preferred means to adjust the degree of balance. First, there is a wall-mounted attenuator 164 (FIG. 1) that can impinge in the reference beam path to attenuate the reference beam. In the exemplary protoype, a wall mount 166 mounts a ¼–40 machine screw 168. The screw 168 was mounted near the edge of the beam, on an axis perpendicular to the beam direction. The end of the screw is turned down to a small rod 170, 1 mm diameter by 5 mm length. The position of the fine rod can be accurately adjusted with the fine screw thread. This screw, which provides a relatively coarse adjustment, can be used to balance the photocurrents $i_S$ and $i_R$ to about 1 part in $10^3$. Second, the photocurrent input to 212 (FIG. 2) can be nulled electronically by adjusting potentiometer P209 (FIG. 2), as described above. With the electronic adjustment capability, the photocurrents can be balanced to better than 1 part in $10^5$. By making the time constants of the feedback loops similar to the rise time of the detectors, tracking error in the small balance current is minimized. Except for the very small amount of current (<2%) supplied through R211, none of the current from either detectors is subject to electronic filters which could attenuate the high frequency components of the source noise. This ensures the fast response required for accurate noise cancellation. In addition, the main bulk of the detector currents does not flow through any electronic components. Finally, by making resistor R211 fairly large, additional noise produced because of its presence in the input circuitry of the difference amplifier will also be very small, experimentally found to be below the detector shot noise. The output of the difference amplifier 212 can be made small, of the order of 10 $\mu$V, by accurately balancing the beams electronically. In experiments with the exemplary experimental prototype, we set this output to order $10^2$ µV, so that with G=100 for amplifier 212, $V_D$ was of order 10 mV. Both sample and reference outputs, K'$V_S$ and K$V_R$ need be of sufficient size to provide required feedback current to null the photocurrent input. However, the required voltages are less than 1 V in the preferred embodiment. This obviates the need for high resolution digitization.

Figure 2B:
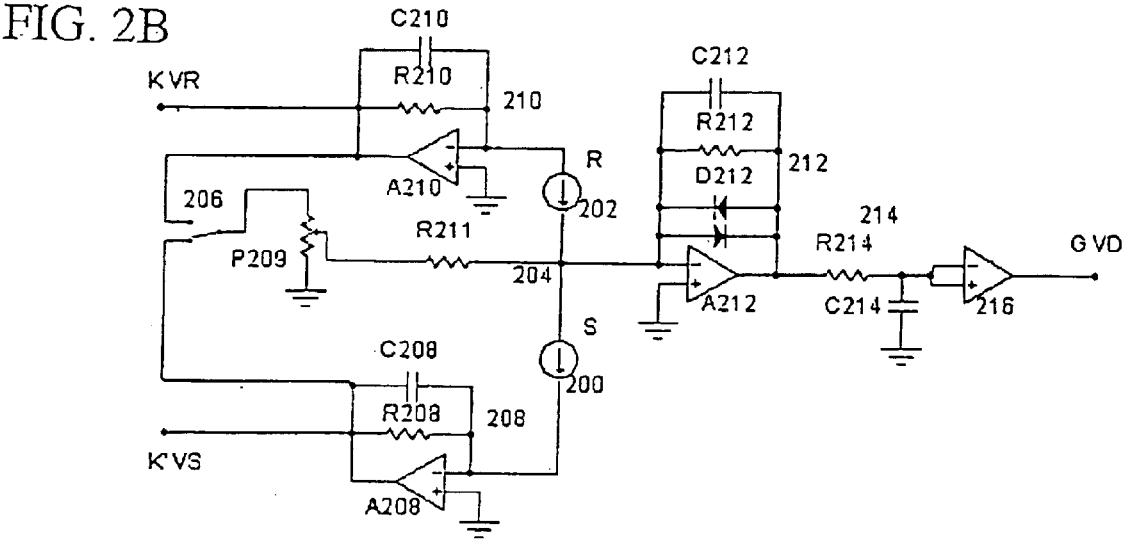

The circuit shown in FIG. 2A is suitable for use with a scanning instrument, where the light wavelength is continuously varied while taking data. Prior to making the measurement at each discrete wavelength, the beams must be balanced as described above. Since the relative powers of the Sample and Reference beams are expected to change over the wavelength range scanned, the ability to change the sign of the feedback current is a desirable feature, which is included in this circuit. A second preferred embodiment detector circuit is shown in FIG. 2B, where common components are labeled using the FIG. 2A reference numerals. This circuit is suitable for use with a unit operating at a single wavelength, as with a filter instrument. With this type instrument, it is not necessary to change the sign of the feedback current, since the measurement is made at only one wavelength. In FIG. 2B the balance current, derived from either the Sample or the Reference, is selected by a switch 206, so that only a single polarity current is available at any given time, depending upon the setting of the switch 206.

Our laboratory studies resulted in a discovery that after the source noise is cancelled thermal drift becomes dominant. Accordingly, another aspect of the invention is limiting thermal drift in the differential light power ratio. Preferably, thermal drift in the differential light power ratio, $\Delta P/P_R = (P_S - P_R)/P_R$ is limited to below $10^{-6}$ during the data acquisition period, which could be as long as 15 min in certain practical applications of the invention or aspects thereof. The relative differential voltage ratio $V_D/V_R = (V_S - V_R)/V_R$ is the experimental measure of $\Delta P/P_R$, so that what is of concern experimentally is differential voltage stability. For the first preferred embodiment, a number of design features were identified and selected to limit thermal drift and to assure a high degree of differential stability. In particular, we sought to reduce temperature drift so that thermally induced changes in $V_D/V_R$ in the first embodiment will be of the order $10^{-6}$ or less over the measurement interval. This is consistent with overall noise at the detector shot noise limit. The preferred selection of identified factors given below become important when it is desired to measure light power changes on the order of $10^{-6}$. Since these factors have little impact on one's ability to detect power changes of order $10^{-4}$ or larger, the importance of thermal stability has not been generally appreciated. The analysis of thermal drift requires use of a number of thermal coefficients. Literature values were used for thermal coefficients when available; otherwise reasonable estimates of the coefficients were made by us. In some cases, the required coefficient was obtained by direct measurement. A first aspect of this portion of the invention involves the selection of components to address in the optimization of practical spectrophotometers according to the invention.

The beam splitter 136 is the most likely optical component for producing differential instability. In addition to the polarization of the incident beam 134, the splitting ratio is also very sensitive to the angle of incidence and the wavelength of the light. The incident angle dependent of $V_D/V_R$ is $6\times10^{-3}$ per degree. This means that a change in the angle of incidence of only 0.001 degree will cause $V_D/V_R$ to change about $6\times10^{-6}$. Such a small change in the angle of incidence could easily occur due to temperature induced expansion and twist of the beam splitter holder. The magnitude of any change that actually occurs will strongly depend on the structure and material of the beam splitter mount. The relatively large mount 137, made from a solid steel block provides both thermal and mechanical stability. A beam splitter holder in the experimental prototype was ½" thick brass plate, 3" high and 3" wide.

The interference filter 126 used in the exemplary experimental prototype had a temperature coefficient of 0.023 nm/° C., while the wavelength dependence of the differential ratio $V_D/V_R$ is $5\times10^{-4}$/nm for the dielectric beam splitter 136. This gives a composite coefficient of $1\times10^{-5}$/° C.

Temperature changes will also cause changes in the reflectivity of the beam splitter 136 which in turn have a minor effect on $V_D/V_R$, about $6.2\times10^{-6}$/° C. at a 45° angle of angle of incidence. This is caused by temperature induced changes in the refractive indices of the optical materials used.

For applications involving the use of liquid samples, the effect of temperature on the reflectivity of the two solid-liquid interfaces at the windows of liquid cells positioned in the cell holders 154 and 156 was identified as a factor contributing to thermal drift. For example, the temperature coefficient of the reflectivity of a silica/methanol interface is $\sim1.45\times10^{-5}$/° C. This translates to $2.9\times10^{-5}$/° C. in the relative differential voltage ratio since each cell has two surfaces, which introduces a factor of 2. The much larger thermal coefficient for reflectivity at solid/liquid interfaces is due to the much larger coefficient of thermal expansion for liquids. This type thermal drift may not be cancelled completely by using two identical liquid cells if the liquid in the sample cell is frequently changed. This is because the temperature stability of the sample cell will be adversely affected each time the liquid is changed, whereas that of the reference cell will not be so affected.

Temperature changes will also cause the dark current of the two detectors 178 and 180 to change. Because of the configuration of the preferred embodiment detector circuit in FIGS. 2A and 2B, the dark currents of the detectors 178 and 180 tend to cancel. However, mismatched detectors can reduce the cancellation effect. In the case of a severe mismatch, residual dark current could be as large as 150 pA. The temperature coefficient of the dark current is 115%/° C., which could translate to as much as 172 pA/° C. in the differential dark current. In the exemplary experimental embodiment, photocurrent is in the order of 2.0 µA. Therefore, the detector dark current creates a potential drift rate of $8.6\times10^{-5}$/° C. in the relative differential voltage ratio $V_D/V_R$.

An optimization goal for a preferred embodiment design was set forth based upon experimental observations, and by considering that a reasonable time is needed for making a measurement (up to 15 min). The inventors estimate that the maximum allowable thermal drift rate consistent with a measurement of $1\times10^{-6}$ AU is approx. 0.001° C./min. Experimentally measured temperature drift rates at several positions inside the housing of our experimental prototype embodiment were made using precision thermistors and observed thermal drift rates are at or below this preferred limit.

Another aspect of the invention is thermal stabilization of components. Primary passive thermal stabilization in embodiments of the invention has two aspects. Within the housing, components are made from materials having a high thermal conductivity, e.g., solid aluminum, steel, brass and other metals. Heat transfer among internal components promotes thermal equilibrium within embodiments of the invention. Insulation against outside environments is another aspect, which protects the instrument against changes in the surrounding environment by slowing a device's response thereto. A thick base plate having a large thermal capacity is provided, e.g., a thick base plate made of ¾ inch stainless steel plate, as a foundation for heat transfer among internal components. Bulky metal optical mounts also provide a large thermal capacity and great mechanical stability. In the exemplary experimental prototype, the mounts were solid steel blocks approximately ¾" thick mounted directly to the base plate. In the exemplary experimental prototype, the heat capacity of the entire instrument (FIG. 1) was about 25 kJ/° C. The entire housing is thermally shielded with a layer of ½ inch commercial insulation material 113. This acts to slow the response of the device to changes in the surrounding environment. As mentioned above, in the exemplary experimental prototype, the interior thermal drift rate was measured at 0.001° C./min or less, which according to the analysis, indicates a capability of detecting a light power change of $1 \times 10^{-6}$ AU (Absorbance units) measured over a period of 15 min. In the preferred embodiment of FIG. 1, the compartmentalized structure and wall mounted components also promote thermal stability. The preferred embodiment includes six separate compartments 160a–160f. Compartmentalization accomplishes multiple benefits that lead to reduced susceptibility to thermal drift, either directly or indirectly. First, the compartmentalization allows some of the optical components to be mounted on housing walls, which provides good thermal contact and stability. Walls 122, 128, 148, 162, and 176 facilitate this goal in the preferred FIG. 1 embodiment. Second, it allows the sample and reference cell to be optically isolated, which minimizes problems associated with stray light. This goal is facilitated by walls 148, 162, and 176. In addition, the interior surfaces of the walls and housings are preferably coated with a light absorbing material, e.g., matte black paint.

Lenses, filters, and mirror, e.g., 114, 124, 126, 132, 142, 144, 146, 172, and 174, are configured to be resistant to variation of performance due to temperature change. The mounts for optical components are solid and bulky. The large size is to ensure stability against thermal expansion. The holder for the beam splitter is made quite massive, e.g., three inch square and ½ inch thick solid metal, to minimize potential thermal drift. Although the exact temperature coefficient is not known for the beam splitter assembly, the differential drift caused by the beam splitter is definitely below $1 \times 10^{-6}$ over a 15 min. period or $6.7 \times 10^{-5}$/° C.

A typical silicon photodiode detector may possess a reflectivity near 20% in the visible region (400–750 nm). Trapping reflected light from the detector surfaces has been determined to be beneficial. Light propogating back toward the sample holder 154 or the reference holder 156 can lead to undesired reflection and scattering. If reflected light is allowed to propagate back toward the sample or reference cell holders 154 and 156, multiple reflections can be created between the surfaces of cells, lenses, and detectors. With multiple reflections, any small thermal change resulting in repositioning of any of the these components could have an effect that prevents detection of light changes at the $10^{-6}$ level. The reflection from the detector surface is controlled in the preferred embodiment to address this problem. The preferred manner of reflection control includes aligning the surfaces of the sample detector 178 and reference detector 180 at an angle that is not perpendicular to the incident beam.

In the preferred embodiment (FIG. 1), the angle of incidence on the detector is 45° so that the propagation direction of the reflected light is 90° to the incident beam. The housings 182 and 184 for the detectors mount the detectors at an angle to direct reflected light beams 186 and 188 into respective light traps 194 and 196. Any angle between a lower limit sufficient to direct the light into a light trap and an upper limit that allows all the light to be collected by the detector may be used. The values for these limits will be determined by the cross sectional areas of the light beam and detector. The reflected light 186 and 188 is trapped by the light traps 194 and 196, the inside surfaces of which are painted black. It was found in the experimental prototype according to the first embodiment that the detector housing with reflection control and light traps is important to achieving reproducible results. Trapping the reflected light by the detector surface is believed important for the determination of Absorbances below $5 \times 10^{-5}$ AU.

Any type of contaminant or particulate in the paths of the beams through the sample or reference will cause an interference. As used herein, contaminants and particulates have been identified to include, for example, bubbles, dissolved gases, and dust. For example, if the beam cross-section in the sample region is about 5 mm$^2$ (as in the exemplary prototype according to the first embodiment), then any particle with cross-section larger than 5 $\mu$m$^2$ or a diameter larger than 2.3 $\mu$m could cause a noise peak greater than $1 \times 10^{-6}$ AU. We found in our investigations that problem-causing airborne particles usually settled to the bottom of the sample chamber within 20 minutes after closing the chamber. The presence of airborne dust particles in the sample beam was manifested in a series of positive-going sharp spikes in the Absorbance during testing of the exemplary prototype according to the first embodiment. The dust peaks tend to decrease with time as the particles settle. For particles in liquids, on the other hand, it usually takes several hours for particles to settle to the bottom of the cell because of Brownian movement. In addition, any temperature change will tend to reactivate their movement across the entire liquid cell. This is a serious problem for detection of very small Absorbances in liquid samples. In our testing, these particles can easily cause a noise as high as $5 \times 10^{-5}$ AU.

In tests, it was determined that due to dust in the air, the traditional cuvette structure with stopper is not suitable for determination of Absorbances below $5 \times 10^{-5}$ AU, because dust particles will tend to enter the cuvette anytime during the process of washing the cell or changing the liquid. Furthermore, opening the sample compartment will tend to introduce airborne particles into the optical system. A solid metal body bored out to create the necessary liquid flow channels and openings is preferred. The inventors also identified additional potential noise sources in addition to the dust problem. For example, it was determined that the temperature of the liquid may be different from that of the cell by several degrees. Commonly used quartz cells exhibit relatively small heat conductivity and accordingly often need five minutes or longer for the temperature of the liquid to stabilize. Another aspect of the invention addresses potential noise from dust/particulates and variation of cell temperature.

A preferred embodiment liquid cell is shown in FIGS. 3A and 3B. The cell includes a body 302 made from material that imparts a large heat capacity and good thermal conductivity and defines a closed liquid delivery system. The body should also be chemically stable to most organic solvents if applied to a general purpose instrument, while specific purpose instruments may be tailored to be resistant to particular solvents. The chemical stability can further be improved by coating the inside of the cell with a thin layer of Teflon or other material. In the experimental embodiment, a stainless steel body was used.

Windows 304 and 306, held in place by endcaps 308 and 310 with gaskets, are also made of a material that should be selected to provide chemical and thermal stability. In the exemplary experimental prototype, ¼" thick optically flat, fused quartz discs were used as windows. The windows were held in place by the endcaps (308 and 310) and thin Teflon gaskets were placed between the windows and the cell body to serve as seals, and between the windows and two endcaps 308 and 310.

Light enters and exits the cell through ports 312 and 314 and passes through the cell in an interaction region defined in a path between the windows 304 and 306. The cell has three outlets: bottom 318, side 320, and vent 322. The vent 322 maintains internal cell pressure in equilibrium with the environment. The vent 322 has a fitting 324 connected to tubing 326 (1/16 inch stainless steel in the exemplary experimental prototype) and terminated with a filter 328 (1 $\mu$m filter in prototype) to prevent dust particles in the air from entering the system. This vent also preferably contains a small window 330 through which the liquid level in the cell can be monitored. This is useful for human monitoring, though it will be unnecessary in automated instruments. In an automated instrument the level of fluid can be precisely controlled by the liquid delivery system 332 and/or there might be an alternative electronic method for monitoring the fill level. The chosen level monitoring can be a sensor, such as a conductivity sensor for example, but must be chosen carefully to avoid a thermal effect on the liquid. The side outlet 320 is used for sample injection by sealed liquid delivery system 332, e.g., a syringe. Outlet 320 is coupled to the liquid delivery system 332, via a fitting 334 and tubing 336, and a filter 338 (0.20 $\mu$m Teflon filter in the exemplary prototype) to remove any residual particles in the liquid. The bottom outlet 318 is connected to a controlled drain 340, e.g. a stopcock, which allows the cell to be drained. The drain is connected via tube 342 and fitting 344.

The preferred filtering method allows the particulates inside the cell to be efficiently removed by the wash through process. In the experimental prototype, it was found that initialing washing the cell 5 or 6 times was sufficient to remove dust particles. In a commercial embodiment, this type of washing would occur at device set-up, for example. Following this, it remains clean as long as the liquid is injected into the cell through proper filters. Each filter should last for quite some time since particle concentrations in "clean" liquids to be analyzed in typical instruments, e.g., chemical analysis, is likely quite low. The preferred cell in FIG. 3 may remain inside the unit so that the entire structure can remain closed during measurement procedures, including the introduction and removal of liquid. In commercial embodiments directed to liquid analysis only, the cell should preferably be permanently fixed as a closed system in the housing accessible by the liquid delivery afforded by the cell. The overall preferred FIG. 1 embodiment also preferably has a large thermal mass. Using cell materials having a large heat capacity and exhibiting good thermal conductivity for the FIG. 3 sample cell is also preferred to maintain thermal stability. In the exemplary experimental prototype, according to FIG. 3, the volume of the cell is about 2.6 cm$^3$, and the optical pathlength of the cell is about 1.0 cm.

Figure 3:
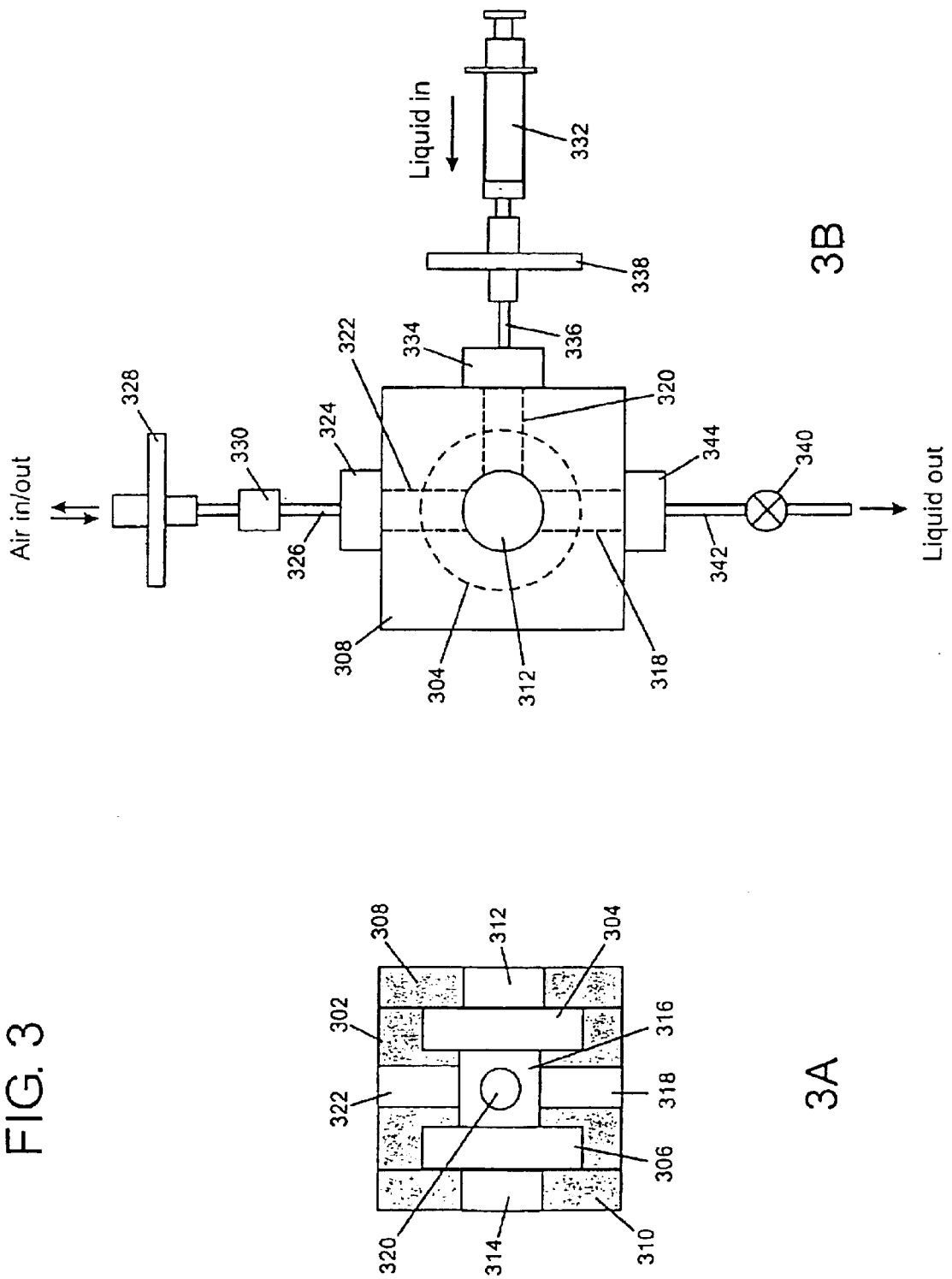
FIG. 3 illustrates a preferred embodiment liquid cell.

Filtering the liquid entering the sample cell of FIG. 3 removes dust and particulates. However, bubbles and dissolved gases were also identified as potential contributors to noise. Another aspect of the invention deals with treatment to removed dissolved gases from liquid samples. This is accomplished by a degassing pre-treatment of the liquid prior to entering the sample cell, e.g., an ultrasonic treatment. Preferably, in practice of the invention for liquids samples, both the solvent and the analytical solution are degassed. The degassing removes dissolved gases. Generally, bubbles will not be an issue with the sample cell of FIG. 3 when is delivered in the closed system. However, the degassing would obviously also remove bubbles.

III. Test Results for an Experimental Prototype According to the First Embodiment The inventors have tested the experimental prototype to verify that the various aspects of the invention will increase sensitivity. As has been mentioned, specially manufactured devices according to the invention may produce better results. Noise is present both as relatively rapid random fluctuations and as relatively slow drift. Both types of noise are similar but occur on different time scales.

A. First Prototype Test—Instrumental Noise Levels

Figure 4:
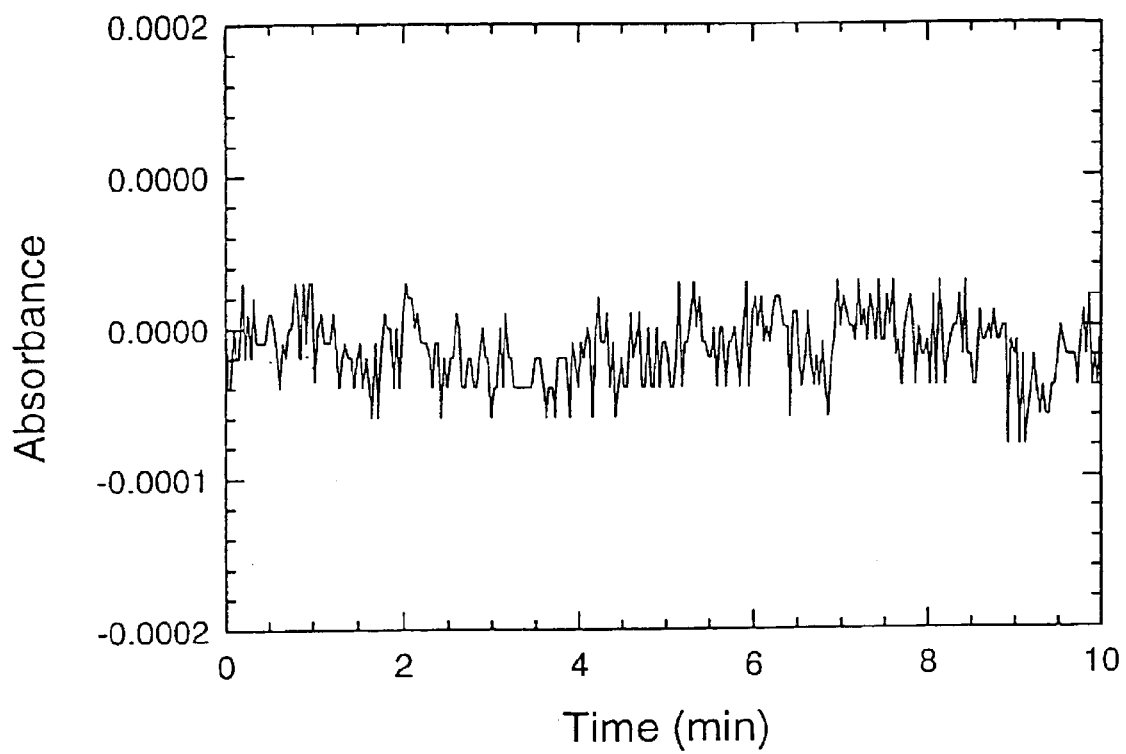
FIG. 4 illustrates the noise level in Absorbance units exhibited by a Perkin-Elmer λ-14 UV-Visible Spectrophotometer (prior art) at 633 nm wavelength using 1 s. time constant.

The noise level in Absorbance units exhibited by a Perkin-Elmer $\lambda$-14 UV-Visible Spectrophotometer is shown in FIG. 4. Data were recorded using the Time Drive capability with the wavelength set at 633 nm and 1 sec time constant. No sample or reference cells were present so the figure represents the fundamental noise of the instrument. A standard deviation noise level of $2.5 \times 10^{-5}$ AU is indicated, which is consistent with published noise specifications of commercial spectrophotometers. We have found that the observed noise level varies between $2.5 \times 10^{-5}$ and $4.5 \times 10^{-5}$ AU over time. The limited resolution of the digitizer can be clearly seen in FIG. 4. The noise is not well described by a Gaussian distribution, and by close inspection of FIG. 4, it can be seen that there may be a contribution to the noise from a relatively slow drift.

Figure 5:
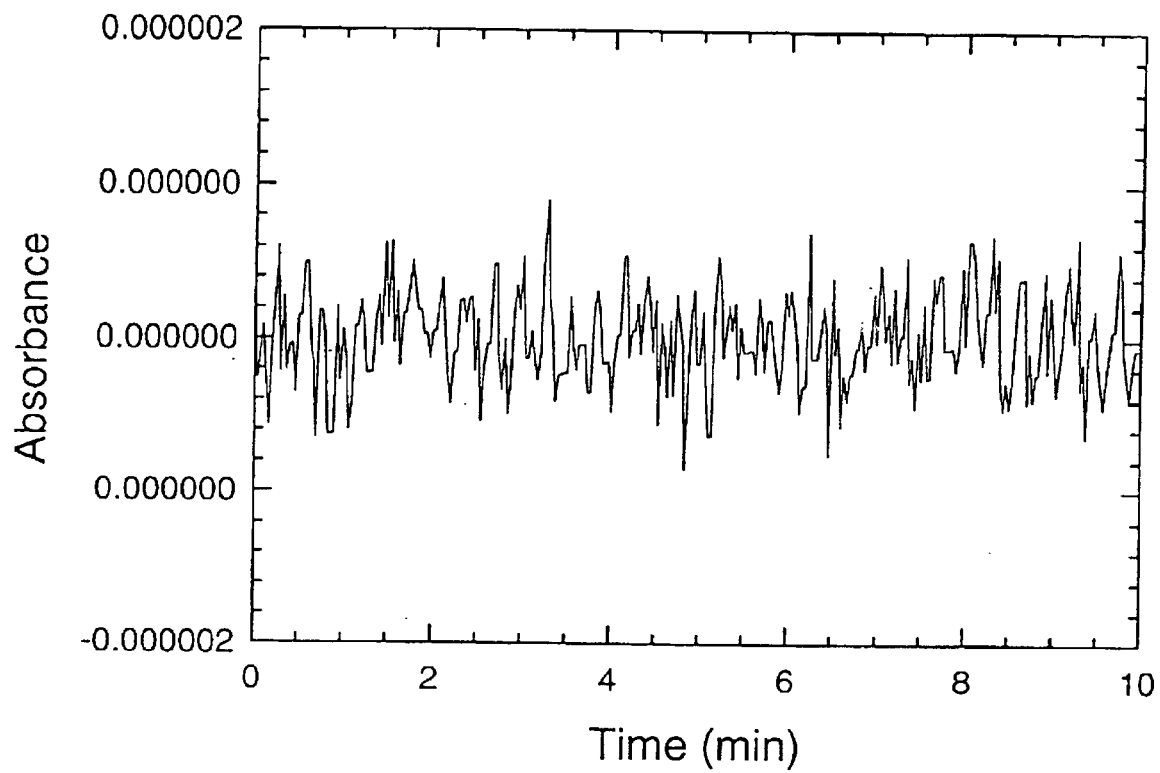
FIG. 5 illustrates the noise level in Absorbance units exhibited by an exemplary experimental prototype at 633 nm wavelength using 0.3 s. time constant.

A corresponding plot for our exemplary prototype, with data taken under almost identical conditions (633 nm and 0.3 sec time constant), is shown in FIG. 5. The scale is 100 times smaller in FIG. 5 than in FIG. 4. Comparison of the two figures shows that the noise level in our exemplary prototype unit is about 100-fold smaller than that of the commercial instrument. With use of a 1 sec. time constant in the prototype, the noise level would be even lower. In addition, because of the very low noise level in the unit, the inventors estimate that it should be possible to measure Absorbance values approaching $1 \times 10^{-6}$ AU.

The standard deviation noise level in FIG. 5 is $3.0 \times 10^{-7}$ AU and the total shot noise standard deviation from two detectors is calculated to be $2.4 \times 10^{-7}$ AU. Thus, the observed noise is essentially at the shot noise limit. Since the source noise is about $2 \times 10^{-5}$ AU and the shot noise is $2.4 \times 10^{-7}$ AU, if the beam imbalance is 1%, the source noise will be cancelled to the shot noise limit. This shows that critical balancing of the beams is not required and balancing them to 0.1% should be sufficient to ensure that the source noise can be neglected with respect to the shot noise.

B. Second Prototype Test—Liquid Sample of Nile Blue Solution

In this test, the Absorbance of $5 \times 10^{-10}$ M Nile Blue in Methanol was determined. A liquid cell constructed according to FIGS. 3A and 3B was used to house the liquid during measurement. The cell had a 1.9 cm path length and measurement was made at 633 nm with a 0.3 sec time constant. The beams were balanced by a combination of the use of clear glass slides for beam attenuation, adjustment of attenuator 164 (FIG. 1), and adjustment of P205 (FIG. 2).

The Beer-Lambert Law states that $A=-\log T$ with $T=Q/Q_0$, which is required to correct for all loss of light other than that absorbed by the chemical substance under analysis. The terms are evaluated as described previously, $Q_0=V_{D0}/V_{R0}+1$ and $Q=V_D/V_R+1$. Since $A=-\log (Q/Q_0)=-\log Q+\log Q_0$, we can consider the term $-\log Q_0$ to be a baseline, which is determined by placing pure Methanol (the solvent) in the sample cell and measuring $Q_0$. Before the measurement, the cell must be flushed enough times with pure solvent to remove residual impurities, particularly suspended dust and particulate matter, from the cell. After sufficient flushing, $Q_0$ is measured and $-\log Q_0$ is computed. In principle, the baseline could be zero. This would be the case for perfectly balanced Sample and Reference photocurrents so that $V_D=0$, $Q_0=1$, and $-\log Q_0=0$. In practice, the photocurrents are sufficiently balanced only to ensure adequate noise cancellation, so that $V_D$ is small but non-zero, $Q_0 \neq 1$, and $-\log Q_0 \neq 0$. Next, after rinsing the cell several times with the Nile Blue solution, Q is determined with the solution in the sample cell and $-\log Q$ is calculated. Finally, the baseline, $-\log Q_0$, is again determined with Methanol in the cell to assure that there is little or no baseline drift.

Figure 6:
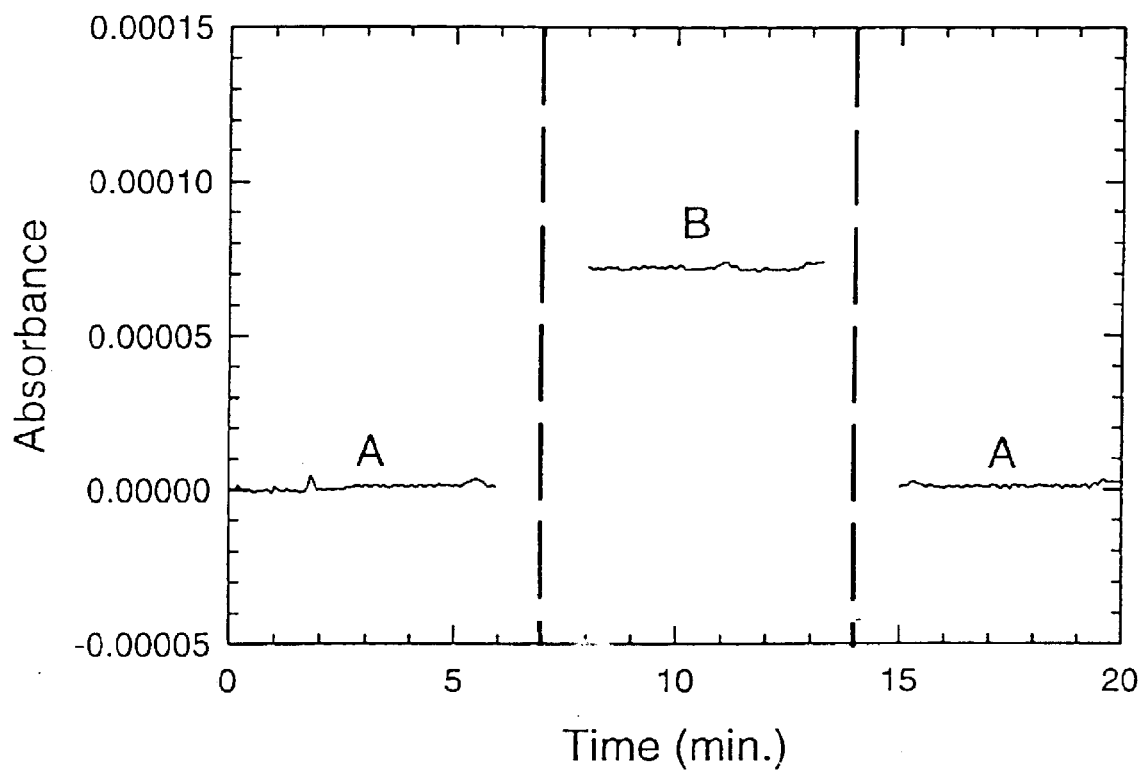
FIG. 6 illustrates results of an Absorbance test of $5 \times 10^{-10}$ M Nile Blue in Methanol by an exemplary experimental prototype at 633 nm wavelength using 0.3 s. time constant, with use of its 0.2 μm liquid sample filter.

The results are shown in FIG. 6. The regions marked "A" are $-\log Q_0$ (baseline) measurements made with Methanol and the "B" region is the $-\log Q$ measurement made with the Nile Blue solution. The Absorbance, the quantity that is proportional to the concentration of Nile Blue according to the Beer-Lambert Law, is equal to the absolute difference between the readings in the A and B regions. In FIG. 6, $-\log Q_0$ has been subtracted from all data points so that the baseline A readings equal zero Absorbance (which is required by definition) and the B readings equal the Absorbance of the $5 \times 10^{-10}$ M Nile Blue solution with 1.9 cm path length, in which all interferences have been removed.

The inventors have observed that when a liquid is measured as in FIG. 6, there is additional noise above the inherent level of the instrument as shown in FIG. 5. We believe that in order to approach the absolute noise level of the instrument, three noise sources must be carefully minimized: (i) airborne dust, (ii) particulates suspended in the liquid and (iii) dissolved gases. A 0.2 μm filter was used to remove particulates suspended in the liquid; thus the additional noise may be due to dissolved gases in the liquids. Noise attributable to airborne dust particles is not present in this figure, because the experiment was carried out by injecting the liquid directly into the cell without opening the chamber.

As previously mentioned, it was also determined that the noise level can be reduced by removing dissolved gas from the liquid prior to making spectrophotometric measurements. This was accomplished in the prototype experiments by placing a glass bottle containing the liquid into an ultrasonic cleaning unit for 5 min. In practice, both the solvent and the analytical solution must be degassed.

C. Third Prototype Test—Unfiltered Solution of Nile Blue

Figure 7:
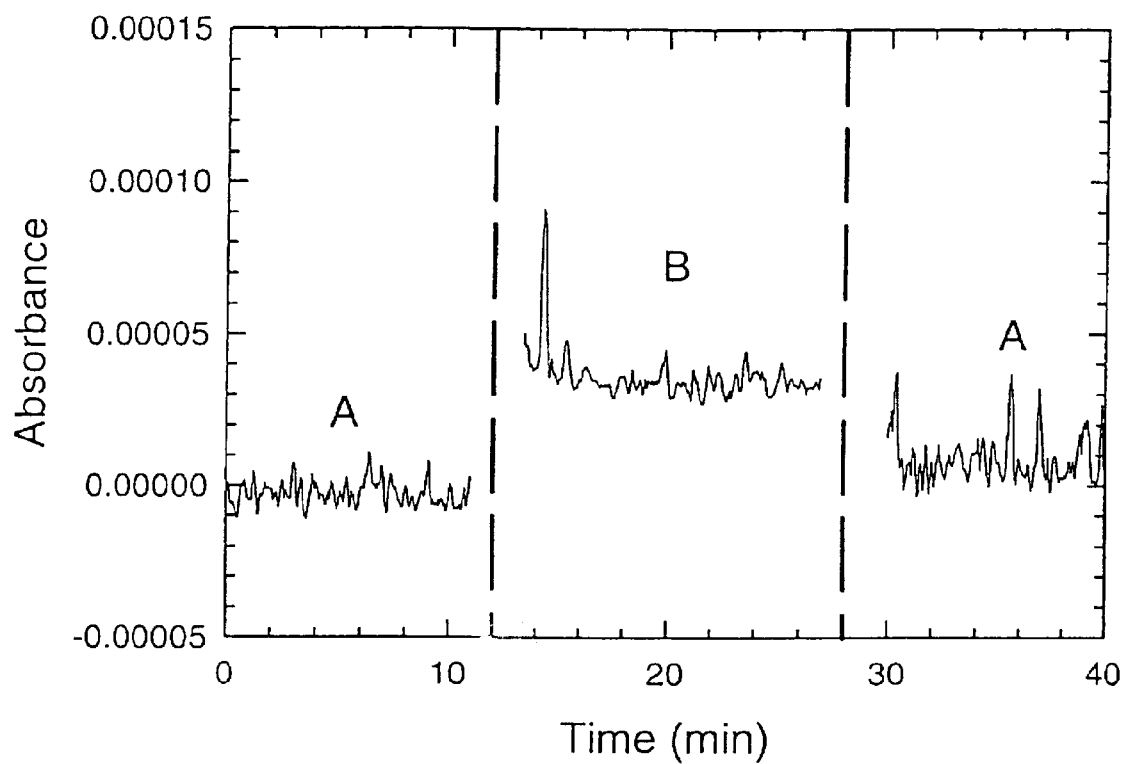
FIG. 7 illustrates the results of measurements made on a $5 \times 10^{-10}$ M solution of Nile Blue in Methanol by an exemplary experimental prototype without use of its 0.2 μm liquid sample filter at 633 nm wavelength using 0.3 s. time constant.

The effect of particulates was tested by studying the unfiltered liquids in a standard commercial silica cuvette. The results of measurements made on a $5 \times 10^{-10}$ M solution of Nile Blue in Methanol without use of the 0.2 μm filter are shown in FIG. 7. The pathlength of the cell was 1.0 cm. The presence of much higher overall noise and large noise spikes is evident. Noise attributable to airborne dust particles is not present in this figure, because the experiment was carried out by injecting the liquid directly into the cell without opening the chamber.

D. Fourth Prototype Test—Study of Glass Slide with Nile Blue Coating

Figure 8:
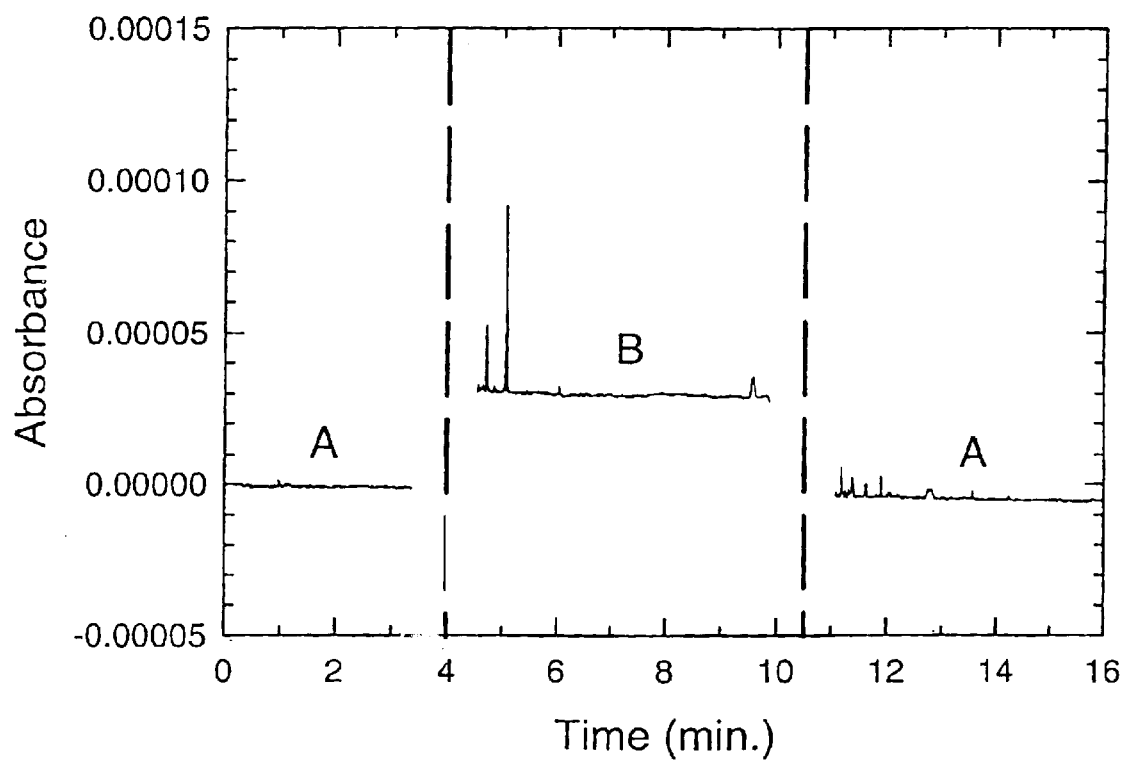
FIG. 8 illustrates results of measurements made on an optical quality quartz slide coated with a submonolayer of the dye Nile Blue, approx. $1.2 \times 10^{11}$ molecules/cm$^2$ at 633 nm wavelength using 0.3 s. time constant.

A glass slide with a Nile Blue coating was prepared to check for effects related to airborne dust. The test was conducted using an optical quality quartz slide coated on both sides with a submonolayer of the dye Nile Blue, at a level of $1.2 \times 10^{11}$ molecules/cm$^2$. The reference was a clear (uncoated) optical quality quartz slide. Since this is not a liquid sample, the problems of dissolved gases and suspended particulates are of no concern. The results are shown in FIG. 8. The slide was coated to give an Absorbance of about 0.00003 AU. It is immediately evident that, with the exception of some large positive-going noise spikes, which are attributed to airborne dust particles, the overall noise is much lower than that shown in FIG. 7. Airborne dust particles are introduced into the sample chamber whenever it is opened, e.g., to change the slide. The reason for the lesser noise is that the sample is not a liquid, and thus, there are no air bubbles.

IV. A Second Preferred Embodiment Multiple Wavelength Spectrophotometer

Figure 9:
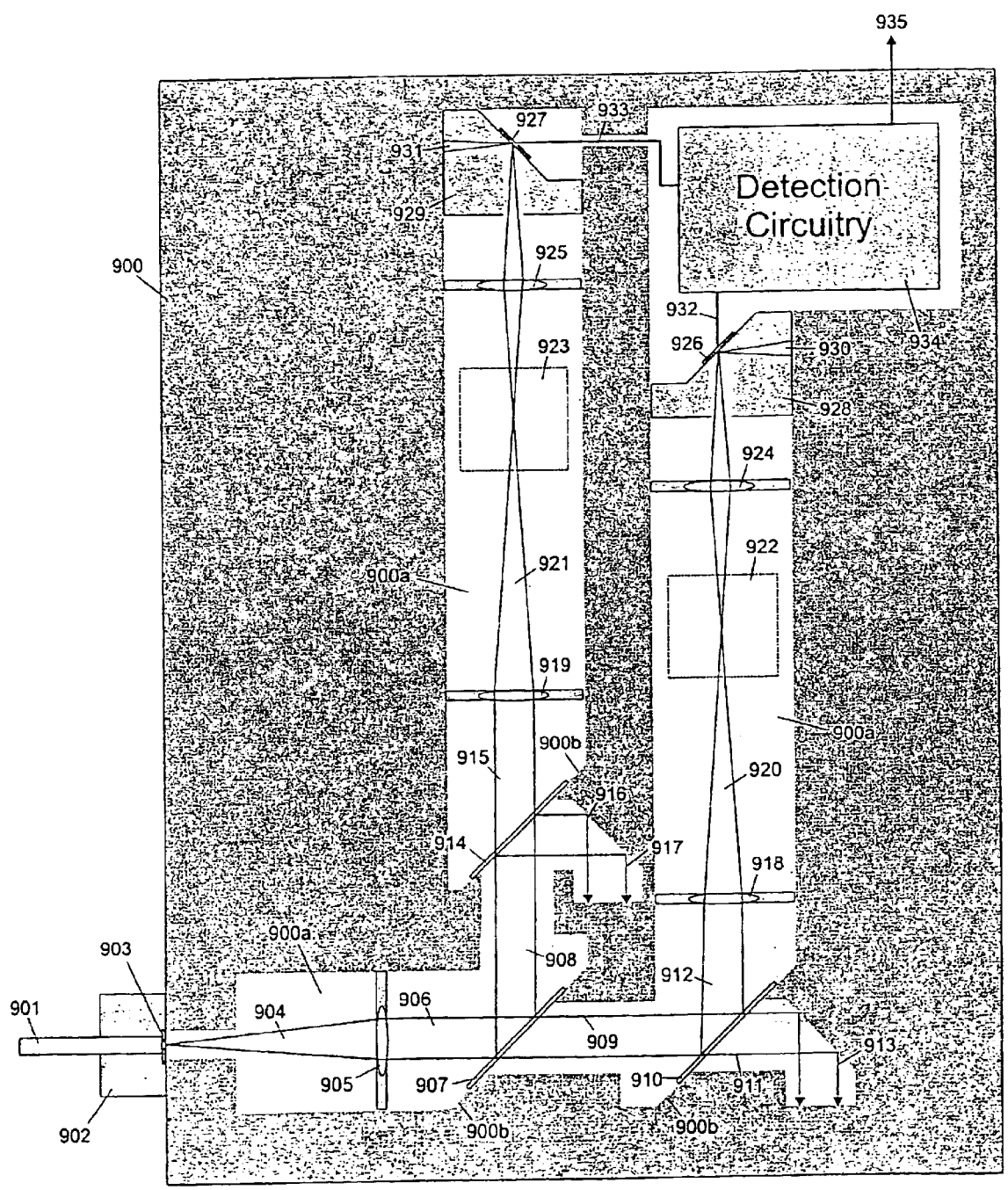
FIG. 9 is a top view (cover removed) of a second preferred embodiment for multiple wavelength measurements.

The aspects of the first embodiment concerning noise reduction/increased sensitivity are applicable to a wide range of instruments. Not all examples will be provided herein, as artisans will understand the general applicability of the combined features of the first embodiment, as well as the independence of each of the aspects of the first embodiment. A second preferred embodiment is shown in FIG. 9 and will be discussed to provide a preferred solution for a second basic type of instrument that is capable of functioning with a range of wavelengths. The first preferred embodiment of FIG. 1 uses a filter, which will allow measurements to be made, one filter at a time. The second preferred embodiment is a unit capable of functioning when a range of wavelengths is scanned. To do this, the unit must accept the light output of a monochrometer. Unmentioned features of the first embodiment may be assumed to apply to the second embodiment, unless specifically mentioned.

Thermal stabilization in the FIG. 9 embodiment is achieved primarily from a unitary solid metal housing 900. A material having a high heat conductivity, e.g. Aluminum, is used. A hollowed portion 900a is carved out in a shape and depth to provide for the mounting and placement of device components. A cover plate (not shown) of solid metal seals the housing 900, which is insulated on all sides, including the cover plate. Excellent mechanical stability is also provided by the unitary structure of the housing 900. The solid unitary metal housing can provide thermal mass in a compact package, permitting a smaller device than in the case of the FIG. 1 embodiment. In FIG. 9, spacing between optical components is exemplary, while the unitary housing permits shrinking the optical path length while still attaining the thermal stability of the invention. The thermal drift of an experimental device according to the second embodiment was measured to be <0.0005° C./min.

Monochromatic light from a monochrometer is coupled into the housing 900 through an optical fiber 901 and an adapter 902 with an aperture 903. The beam 904 passes through a collimating lens 905, and the collimated beam strikes a beam splitter 907 at an angle of incidence of 45° to produce a transmitted beam 909 and a reflected beam 908. The beam 909 strikes a second beam splitter 910 at an angle of incidence of 45° to produce a transmitted beam 911 and a reflected beam 912. Beam splitter 910 is identical to 907. The beam 911 becomes trapped in light trap 913. Similarly the beam 908 strikes the third identical beam splitter 914 at angle of incidence of 45°, which produces a transmitted beam 915 and a reflected beam 916. The walls 900b are machined to precisely mount the splitters 907, 910 and 914 at the angle of incidence of 45°. The beam 916 becomes trapped in light trap 917. At this point, the two beams 912 and 915 should be well matched (identical phase, intensity, and polarization). This beam splitting arrangement obtains the matched beams over a broad wavelength region from UV to far IR. The beams then pass through focusing lenses 918 and 919, which focus the beams 920 and 921 at a sample cell holder 922 and a reference cell holder 923. The beams, refocused through lenses 924 and 925, enter detector housings 928 and 929, where they strike the detectors 926 and 927. Splitters are preferably mounted on the wall structure 900b of the solid metal housing 900. Lenses are held in holders mounted to the base plate. This provides thermal conductivity and mechanical stability. Another option is to provide predefined slots as part of the hollowed portion 900a, e.g., in walls 900b to mount lenses. Beams reflected from the detector surfaces enter regions 930 and 931 of the detector housing, where they are trapped. Detector photocurrents are transmitted through conductors 932 and 933 into detector circuitry 934, where they are processed to produce voltage outputs 935.

The use of three beam splitters in the second preferred embodiment results in the loss of more than half the initial light power. The exact amount depends upon the beam splitter characteristics. To minimize the light loss, commercially available beam splitters with 50/50 (T/R) splitting ratio should be used. Despite the loss of light, the configuration has the great advantage that with three matched beam splitters, the two emergent beams will be of equal power at all wavelengths, i.e., $P_{915}=P_{906} R_{907} T_{914}$ and $P_{912}=P_{906} T_{907} R_{910}$, where reflected fractions, $R_{907}=R_{910}=R_{914}$ and transmitted fractions, $T_{907}=T_{910}=T_{914}$. The beams also have equal polarization and phase at all wavelengths. This greatly simplifies the problem of balancing the beams. Preliminary measurements and calculations made by us indicate that under realizable conditions (machining tolerances and commercial beam splitters), the beam powers will differ by much less than 0.5% over the entire range of wavelength from UV to far IR, which is sufficient to ensure source noise cancellation to well below the shot noise limit. The preferred detector circuit shown in FIG. 2B will function very well with beams of identical power.

Mirror prisms, which are available commercially, could be used in the second preferred embodiment as an alternative to use of the three beam splitter configuration. With a mirror prism, a collimated light beam is divided by reflections from the two-mirrored surfaces of the prism into two beams of nominally equal power. The two beams diverge by 180° so that they must be redirected by reflections from two additional mirrors to become parallel. Because of potential scattering of light by the apex, that region of the Mirror Prism is usual shielded from the light beam. The power ratio of the beams can be adjusted by moving the prism or with appropriately placed apertures. However, based on our experience, we believe that this configuration is more susceptible to thermal drift than is the three Beam Splitter configuration.

V. Exemplary Additional Embodiments and Applications

A. Modulation

Two types of modulation are possible, source beam amplitude modulation, with a chopper, and source frequency modulation. In general, neither type of modulation will be used with our invention because chopping the beam will provide little or no benefit and frequency modulation is typically expensive. However, in some instances chopping the source beam will be necessary, as with the application of the invention to Atomic Absorption.

B. HPLC Detector

Analysis of the effluent from a High Performance Liquid Chromatograph (HPLC) is an exemplary ideal application for our invention. Use of an incandescent light source will provide necessary flexibility in wavelength selection, either by use of filter or a monochrometer. The effluent liquid will be directed through a heat exchanger to sufficiently stabilize the temperature to avoid thermal drift. HPLC flow rates can range between 0.1 to 10 mL/min, but a typical flow rate is 2 mL/min, low enough that temperature stabilization should not be difficult. After temperature stabilization, the liquid will enter the sample cell. Use of noise canceling circuitry will allow substantially lower levels of analytes to be detected.

C. Airborne Particle Detector/Analyzer

Another exemplary application of the invention is for the analysis of airborne particles. Airborne particles may be analyzed, e.g., for weather study, scientific analysis and for the detection of hazardous materials including biohazardous materials. Biohazardous materials such as anthrax spores are particularly dangerous as aerosols containing particles within a specified range of particle sizes. When a human is exposed to such aerosols, infection may result, and if so, within the incubation period of the disease he will generally not exhibit symptoms. This has two unfortunate results. First, he may inadvertently spread the disease, and second, he will not receive early treatment, which is critical. To help protect against the scenario described above, it is important to be able to detect the presence of dangerous aerosols, and to be able to do it as early as possible. Thus something akin to a "smoke alarm" is desirable.

It would be preferably if such a device could determine the size of the aerosol particle. The particles are especially dangerous when the sizes lie within a specific range. The air should be continuously monitored and it should be possible to detect single particles. Over a period of time, the particle size distribution can be determined, which should be of importance as a baseline.

An instrument based upon the FIG. 1 or FIG. 9 prototype should be able to detect airborne dust particles with cross sectional areas down to order 1 $\mu$m$^2$. Furthermore, the cross sectional area of the particles can be calculated from the height of the particle "noise" spike, which makes this an absolute method to determine particle size. There are two factors that determine the lower limit of particle size detectivity. First is the background noise level. It will be necessary to minimize noise to the greatest extent possible as has been done in the first embodiment of the invention. It should also be mentioned that to the extent that we can operate at the shot noise limit, the relative noise level can be reduced by using a more intense source. This is because the relative shot noise is proportional to (Source Power)$^{-1/2}$. Thus, because of its relatively high power, a laser source will be particularly useful for this purpose. Second is the cross sectional area of the light beam as it traverses the sample cell. As the beam is focused down to a smaller size, the amount of light blocked/scattered by a particle of a given size will increase, so that the height of the "noise" spike will increase. The result is that the size detection limit will decrease. A laser is ideal in this respect because it can be easily focused down to a very small size. If sizes and numbers of particles can be continuously monitored, distribution parameters can be used to define a normal background. Departures from the background will signify a potential threat.

There is also the possibility of distinguishing between biological and nonbiological particles in the detection analysis. A light beam passing through airborne particles is scattered by both elastic (Rayleigh) and Raman processes. The Rayleigh scattering depends upon the cross section of the particle; the larger the cross section, the greater the fraction of light scattered. The scattering also depends upon the nature of the particle, so that organic particles will have different scattering cross-section from inorganic particles of the same size. One can readily detect the particle Rayleigh scattering, which is done by placing a detector on an axis perpendicular to the incident beam, and at the same instant, the particle size can be determined as described above. From these data, the scattered light power normalized by the absolute particle cross sectional area can be determined. On this basis, the biological/nonbiological differentiation can be made. The Raman scattering can also be detected and used to make a biological/nonbiological decision. It will be necessary to determine the specific Raman bands to monitor. By use of the specific data available, the following should be determinable: 1. Particle size distribution parameters; 2. Rayleigh scattering intensity normalized by the absolute cross sectional area; and 3. Intensity of one or more Raman bands. From this information it can be determined when there is a high probability of a potential biohazard (presence of pathogen).

Figure 10:
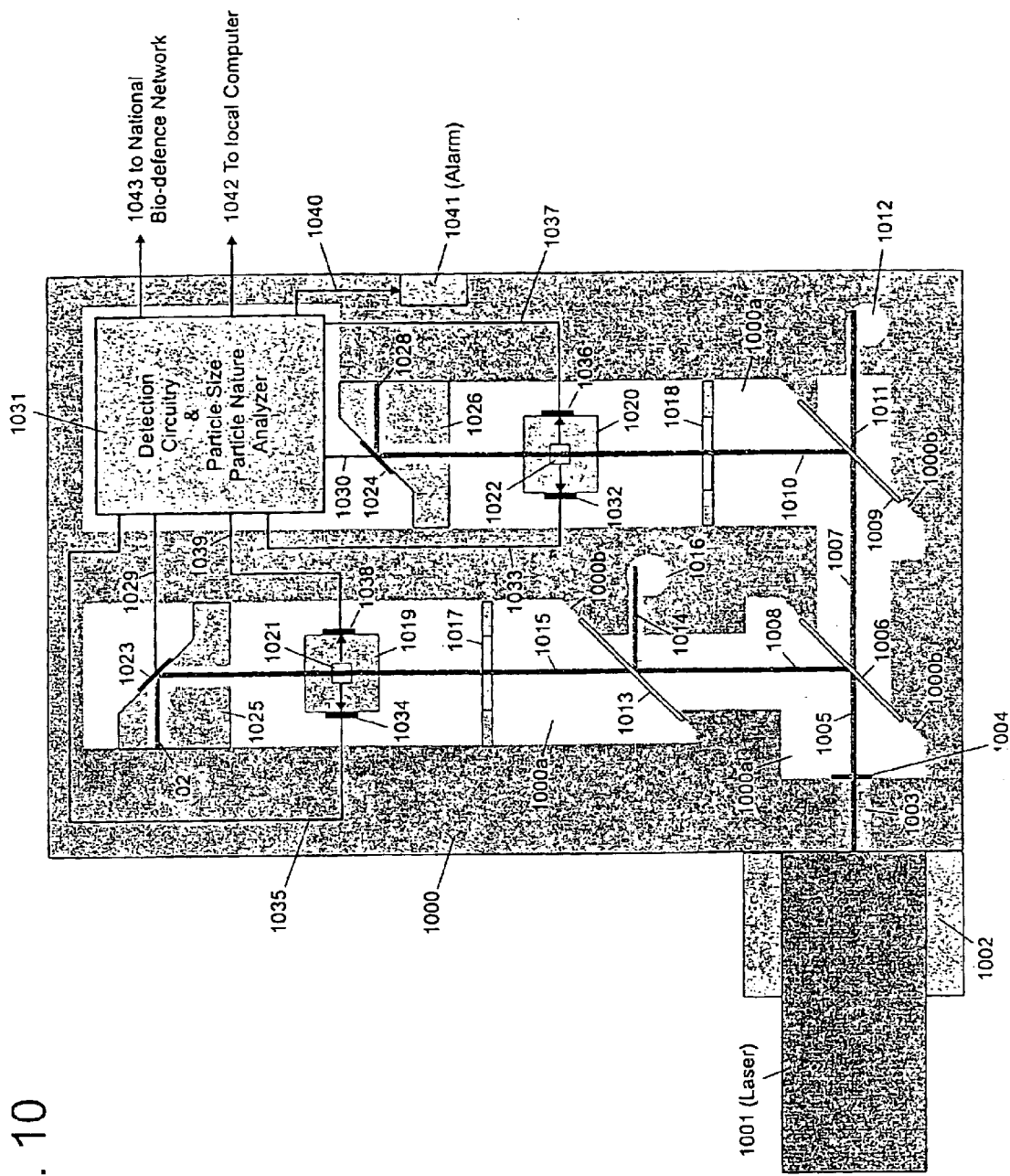
FIG. 10 is a top view (cover removed) of an exemplary preferred embodiment for an airborne particle detector.

An exemplary preferred embodiment for this specific application is shown in FIG. 10. The third embodiment is similar to the second embodiment, having a solid housing 1000 with hollowed portion 1000*a* shaped for component placement and wall structure 1000*b* for beam splitter mounting, and possessing the superior optical stability features of the second preferred embodiment. Referring now to FIG. 10, a laser 1001 acts as the light source and is held by a mount 1002. Laser light passes through a beam expander 1003 and an aperture 1004. A beam 1005 strikes a beam splitter 1006 and is split into two beams. A transmitted beam 1007 strikes a beam splitter 1009 and a reflected beam 1008 strikes a beam splitter 1013. A transmitted beam 1011 and reflected beam 1014 are trapped in light traps 1012 and 1016, respectively. Beams 1010 and 1015 pass through lenses 1018 and 1017, respectively. The lenses focus the beams in one dimension at the center of quartz cells 1019 and 1020. Open sections 1021 and 1022 allow air passage through the instrument. Light beams emerge from both cells and strike detectors 1023 and 1024 mounted on housings 1025 and 1026. The housings are equipped with light traps 1027 and 1028 to trap light reflected from the detector surfaces. Scattered light produced in cell 1019 strikes detectors 1034 and 1038, and scattered light produced in cell 1020 strikes detectors 1032 and 1036.

The open sections 1021 and 1022 are oriented such that air can pass through cells 1019 and 1020 along axes perpendicular to the axes of the transmitted and scattered light. The cross section of the focused beam in the cell is a narrow slit, which is oriented perpendicular to the air-flow axis, so that particles passing through the cell move across the long axis of the slit. Cell 1019 serves as a sample cell and the cell 1020 serves as a reference cell, so that Laser noise cancellation can be done with the type of circuitry shown in FIG. 2.

One of the two detectors mounted on the cell 1019 will be used to detect Rayleigh scattering from the monitored air sample. A similar detector mounted on the cell 1020 will be used to detect the background Rayleigh scattering from the reference air sample. This may be provided from a normal air standard. The difference in the photocurrents from these two detectors will be amplified by the difference amplifier (212 in FIG. 2) so that the signal from airborne particulates can be detected. In addition, with this configuration, the interference arising from background scattering by air molecules will be cancelled.

A second set of detectors mounted on the cells 1019 and 1020 will be used to monitor Raman scattering. The Raman detectors will be fitted with interference filters of appropriate wavelength. The difference in photocurrents from sample and Reference detectors will be amplified by a second difference amplifier configured in the same way as that used above to detect the Rayleigh scattering. If required, the cell may be fitted with multiple Raman detectors, all on axes perpendicular to the laser beam. Currents from the detectors will be used to determine the particle sizes and scattered light powers as described above by use of the detector/analyzer Circuitry 1031. When abnormalities are detected, various warning outputs from this unit can be given. As an example, a local alarm 1041 may be given. Data also might be sent to a local Computer 1042 for logging and analysis. As an additional potential use of the data, the data/alarm may be sent to a national bio-defense network 1043.

While various embodiments of the present invention have been shown and described, it should be understood that other modifications, substitutions, and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A spectrophotometer, comprising:

a sealed housing lacking an internal light source;

a reference cell mounted in said housing;

a sample cell mounted in said housing;

an optical system within the housing to deliver an externally generated light beam through at least two paths, one path passing through the reference cell and another through said sample cell;

a reference light detector for detecting light passing through the reference cell;

a sample light detector for detecting light passing through the sample cell;

a light guide for delivering the externally generated light beam into said optical system from a light source external to said sealed housing.

2. The spectrophotometer of claim 1, further comprising a sealed mount mounting said light guide to said housing.

3. The spectrophotometer of claim 1, further comprising:

a light source external to said housing and optically coupled to said light guide.

4. The spectrophotometer according to claim 1, further comprising a wavelength filter optically coupled to said light guide.

5. The spectrophotometer according to claim 4, wherein said wavelength filter comprises an ultraviolet cutoff filter and an infrared cutoff filter.

6. The spectrophotometer of claim 1, wherein said light guide comprises an optical fiber.

7. The spectrophotometer of claim 6, further comprising means for reducing polarization dependence of light from said light guide.

8. The spectrophotometer of claim 7, wherein said means for reducing polarization dependence comprises a holographic diffuser.

9. The spectrophotometer according to claim 7, further comprising a dielectric beam splitter for splitting the externally generated light beam into separate sample and reference beams emergent on the two paths.

10. A spectrophotometer comprising:
   a housing;
   a reference cell mounted in said housing;
   a sample cell mounted in said housing;
   an optical system within the housing to split a light beam into reference and sample beams and deliver reference and sample beams respectively along one path passing through the reference cell and another path through said sample cell;
   a reference light detector for detecting light passing through the reference cell;
   a sample light detector for detecting light passing through the sample cell; and
   a detector circuit receiving a reference current from said reference light detector and a sample current from said sample light detector, said detector circuit producing a difference voltage proportional to the difference between the reference current and the sample current by a current mode subtraction at a summing point having feedback to balance said reference current and said sample current to produce a difference current that is then converted to the difference voltage,
   said detector circuit simultaneously producing the difference voltage and at least one of a voltage proportional to said reference current and a voltage proportional to said sample current.

11. The spectrophotometer according to claim 10, further comprising passive thermal stabilization means for promoting internal thermal equilibrium.

12. The spectrophotometer of claim 11, wherein said passive thermal stabilization means comprise means for promoting internal heat transfer and insulation from surrounding environment.

13. The spectrophotometer according to claim 12, wherein said means for promoting comprise internal components having a large thermal capacity.

14. The spectrophotometer according to claim 13, wherein said means for promoting include a solid metal base plate.

15. The spectrophotometer according to claim 14, wherein said means for promoting comprises bulky metal optical mounts directly attached to said solid metal base.

16. The spectrophotometer according to claim 11, wherein said passive thermal stabilization means is said housing, which comprises a solid unitary metal housing for mounting and placement of said reference cell, said sample cell, said optical system, said reference light detector, said sample light detector and said detector circuit.

17. The spectrophotometer according to claim 16, further comprising slots in said solid unitary metal housing for holding components of said optical system.

18. The spectrophotometer according to claim 16, wherein said solid unitary metal housing comprises aluminum.

19. The spectrophotometer according to claim 18, further comprising insulation around said aluminum.

20. A spectrophotometer comprising:
   means for obtaining a reference current and a sample current respectively proportional to power of light passed through a reference and power of light passed through a sample;
   a detector circuit receiving said reference current and said sample current, said detector circuit producing a difference voltage proportional to the difference between the reference current and the sample current by a current mode subtraction to produce a difference current that is then converted to the difference voltage; and
   said detector circuit simultaneously producing the difference voltage and at least one of a voltage proportional to said reference current and a voltage proportional to said sample current.

21. The spectrophotometer according to claim 20, further comprising a switch to select one of said voltage proportional to the reference current and voltage proportional to the sample current.

22. The spectrophotometer according to claim 20, wherein said reference current and said sample current are subtracted at an input to a difference amplifier, said difference amplifier then producing the difference voltage.

23. The spectrophotometer according to claim 22, wherein said detector circuit further comprises a feedback loop to feed a small fraction of a smaller one of said sample current and said reference current to said input to said difference amplifier.

24. The spectrophotometer according to claim 23, wherein said small fraction of said smaller one of said sample and said reference current is an amount to produce an approximate $10^{-3}$ or less imbalance between said sample current and said reference.

25. The spectrophotometer according to claim 23, wherein said one of said small fraction of said sample current and said reference current is less than approximately 1% of said smaller one of said sample current and said reference current.

26. The spectrophotometer according to claim 23, wherein said small fraction of said smaller one of said sample current and said reference current slightly amplifies said smaller one of said sample current and said reference current.

27. A spectrophotometer comprising:
   a housing;
   a reference cell mounted in said housing;
   a sample cell mounted in said housing;
   an optical system within the housing to split a light beam into reference and sample beams and deliver reference and sample beams respectively along one path passing through the reference cell and another path through said sample cell;
   a reference light detector for detecting light passing through the reference cell, said reference light detector mounted in a reference detector housing that sets said reference light detector at an angle that is not perpendicular to said reference beam;
   a sample light detector for detecting light passing through the sample cell, said sample light detector mounted in a sample detector housing that sets said sample light detector at an angle that is not perpendicular to said sample beam; and
   a detector circuit receiving a reference current from said reference light detector and a sample current from said sample light detector and producing an output indicating a difference between said sample beam and said reference beam.

28. The spectrophotometer according to claim 27, further comprising:
   light traps in each of said sample detector housing and said reference detector housing to trap light reflected from said sample detector and said reference detector, respectively.

29. The spectrophotometer according to claim 27, wherein said housing comprises a solid unitary metal housing having a hollowed portion shaped to provide for mounting and placement of said reference cell, said sample cell, said optical system, said reference light detector, and said sample light detector.

30. The spectrophotometer according to claim 29, further comprising slots in said solid unitary metal housing for holding components of said optical system.

31. The spectrophotometer according to claim 30, wherein said solid unitary metal housing comprises Aluminum.

32. A spectrophotometer comprising:
a housing;
a reference cell mounted in said housing;
a sample cell mounted in said housing;
an optical system within the housing to split a light beam into reference and sample beams and deliver reference and sample beams respectively along one path passing through the reference cell and another path through said sample cell;
a reference light detector for detecting light passing through the reference cell;
a sample light detector for detecting light passing through the sample cell; wherein
said sample cell comprises a liquid sample cell having
a filtered liquid inlet;
a liquid outlet;
a drain controlling said liquid outlet
a filtered vent to maintain pressure equilibrium;
sample beam exit and entrance ports;
an interaction region; and
sealed windows permitting said sample beam to pass through liquid in said interaction region.

33. The spectrophotometer according to claim 32, wherein said housing is thermally conductive and insulated from outside environment and said sample cell comprises a thermally conductive body connected directly to said housing.

34. The spectrophotometer according to claim 33, wherein said thermally conductive body comprises a substantially solid metal block.

35. A spectrophotometer, comprising:
a substantially solid thermal conductive housing;
a hollow portion in said housing defining light communication paths and component locations;
a light entry aperture in optical communication with said hollow portion;
a collimating lens in optical communication with said light entry aperture;
a first beam splitter in optical communication with said collimating lens;
a second beam splitter in optical communication with a transmissive side of said first beam splitter;
a third beam splitter in optical communication with a reflective side of said first beam splitter;
a reference cell and detection system in optical communication with one of said second and third beam splitters; and
a sample cell and detection system in optical communication with the other of said second and third beam splitters.

36. The spectrophotometer according to claim 35, wherein said reference and said sample cell and detection systems are in optical communication with a reflective side of said second beam splitter and a transmissive side of said third beam splitter.

37. The spectrophotometer according to claim 36, further comprising light traps formed as part of said hollow portion and disposed to trap light transmitted from the second beam splitter and reflected light from said third beam splitter.

38. The spectrophotometer according to claim 37, further comprising additional light traps to trap reflected light from said reference and sample cell and detection systems.

* * * * *